(12) United States Patent
Alarcon

(10) Patent No.: US 8,378,794 B2
(45) Date of Patent: Feb. 19, 2013

(54) SYSTEM AND METHOD FOR TRANSMITTING HAPTIC DATA IN CONJUNCTION WITH MEDIA DATA

(75) Inventor: Ramon Alarcon, Los Gatos, CA (US)

(73) Assignee: Internet Services, LLC, Charlotte, NC (US)

( * ) Notice: Subject to any disclaimer, the term of this patent is extended or adjusted under 35 U.S.C. 154(b) by 427 days.

(21) Appl. No.: 12/602,386

(22) PCT Filed: Oct. 9, 2009

(86) PCT No.: PCT/US2009/060262
§ 371 (c)(1),
(2), (4) Date: Nov. 30, 2009

(87) PCT Pub. No.: WO2010/042884
PCT Pub. Date: Apr. 15, 2010

(65) Prior Publication Data
US 2011/0133910 A1 Jun. 9, 2011

Related U.S. Application Data

(60) Provisional application No. 61/104,658, filed on Oct. 10, 2008.

(51) Int. Cl.
*H04B 3/36* (2006.01)
*A63F 9/24* (2006.01)
*A61M 1/00* (2006.01)
(52) U.S. Cl. ........ 340/407.1; 463/30; 604/346; 604/347
(58) Field of Classification Search ............... 340/407.1; 600/300, 38; 463/30, 36; 434/114, 118, 434/257, 262; 604/346, 347; 128/844, 918
See application file for complete search history.

(56) References Cited

U.S. PATENT DOCUMENTS
5,220,260 A 6/1993 Schuler
(Continued)

FOREIGN PATENT DOCUMENTS
EP 01313050 1/1985
FR 2899461 10/2007
(Continued)

OTHER PUBLICATIONS

Kim, Kyeounsoo, Authorized officer, Korean Intellectual Property Office, International Application No. PCT/US2009/060262, filed Oct. 9, 2009, in International Search Report, mailed May 1, 2010, 11 pages.

(Continued)

*Primary Examiner* — Jennifer Mehmood
*Assistant Examiner* — Hongmin Fan
(74) *Attorney, Agent, or Firm* — Foley & Lardner LLP

(57) ABSTRACT

Methods, systems, and apparatus for generating sensations in response to haptic data. A sensation output device can include a processor adapted to generate one or more control signals corresponding to a haptic command, an actuator adapted to output a force to a drive mechanism in response to one or more control signals received from the processor, an opening through which a portion of a user's body can be inserted, and an interface surface coupled to the drive mechanism, the interface surface configured to at least partially contact the inserted portion of the user's body. Further, the interface surface can be a compliant belt having surface features that is coupled with a carrier belt that is in contact with the drive mechanism. Additionally, the sensation output device can include a memory storing an algorithm including one or more haptic commands, which can be executed by the processor.

20 Claims, 12 Drawing Sheets

U.S. PATENT DOCUMENTS

| | | | |
|---|---|---|---|
| 5,414,337 | A | 5/1995 | Schuler |
| 5,559,412 | A | 9/1996 | Schuler |
| 5,889,670 | A | 3/1999 | Schuler et al. |
| 5,889,672 | A | 3/1999 | Schuler et al. |
| 5,956,484 | A | 9/1999 | Rosenberg et al. |
| 6,028,593 | A | 2/2000 | Rosenberg et al. |
| 6,078,308 | A | 6/2000 | Rosenberg et al. |
| 6,101,530 | A | 8/2000 | Rosenberg et al. |
| 6,125,385 | A | 9/2000 | Wies et al. |
| 6,161,126 | A | 12/2000 | Wies et al. |
| 6,195,592 | B1 | 2/2001 | Schuler et al. |
| 6,275,213 | B1 | 8/2001 | Tremblay et al. |
| 6,317,116 | B1 | 11/2001 | Rosenberg et al. |
| 6,353,850 | B1 | 3/2002 | Wies et al. |
| 6,366,272 | B1 | 4/2002 | Rosenberg et al. |
| 6,368,268 | B1 | 4/2002 | Sandvick et al. |
| 6,750,877 | B2 | 6/2004 | Rosenberg et al. |
| 6,793,619 | B1 | 9/2004 | Blumental |
| 6,859,819 | B1 | 2/2005 | Rosenberg et al. |
| 6,876,891 | B1 | 4/2005 | Schuler et al. |
| 7,131,073 | B2 | 10/2006 | Rosenberg et al. |
| 7,158,112 | B2 | 1/2007 | Rosenberg et al. |
| 7,199,790 | B2 | 4/2007 | Rosenberg et al. |
| 7,636,080 | B2 | 12/2009 | Rosenberg et al. |
| 7,812,820 | B2 | 10/2010 | Schuler et al. |
| 8,072,422 | B2 | 12/2011 | Rosenberg et al. |
| 2002/0138562 | A1 | 9/2002 | Wies et al. |
| 2003/0036678 | A1 | 2/2003 | Abbassi |
| 2004/0082831 | A1 | 4/2004 | Kobashikawa et al. |
| 2005/0014560 | A1 | 1/2005 | Blumenthal |
| 2006/0030383 | A1 | 2/2006 | Rosenberg et al. |
| 2007/0139375 | A1 | 6/2007 | Rosenberg et al. |
| 2007/0279392 | A1* | 12/2007 | Rosenberg et al. ........... 345/173 |
| 2008/0082028 | A1 | 4/2008 | Blevins |
| 2009/0171144 | A1* | 7/2009 | Squicciarini .................... 600/38 |
| 2010/0041944 | A1* | 2/2010 | Levy ............................... 600/38 |

FOREIGN PATENT DOCUMENTS

| | | |
|---|---|---|
| WO | WO-97/21160 | 6/1997 |
| WO | WO-97/25657 | 7/1997 |
| WO | WO-98/06024 | 2/1998 |

OTHER PUBLICATIONS

Hashimoto, Hideki and Manorotkul, Suradech, "Tele-Handshake Through the Internet" (IEEE International Workshop on Robot and Human Communication, 0/7803-3253-9/96)Institute of Industrial Science, Univ. of Tokyo, Tokyo, JP.

Supplementary Extended European Search Report and Opinion from related EP Patent Application No. 09219997, mailed Dec. 6, 2012, 9 pages.

* cited by examiner

1000

| | 7 | 6 | 5 | 4 | 3 | 2 | 1 | 0 |
|---|---|---|---|---|---|---|---|---|
| Byte 0 | D7 | D6 | D5 | D4 | D3 | D2 | D1 | D0 |
| Byte 1 | D15 | D14 | D13 | D12 | D11 | D10 | D9 | D8 |
| Byte 2 | M7 | M6 | M5 | M4 | M3 | M2 | M1 | M0 |
| Byte 3 | C3 | C2 | C1 | C0 | D | A2 | A1 | A0 |

| | D7 | D6 | D5 | D4 | D3 | D2 | D1 | D0 |
|---|---|---|---|---|---|---|---|---|
| Byte 0 | D7 | D6 | D5 | D4 | D3 | D2 | D1 | D0 |
| Byte 1 | D15 | D14 | D13 | D12 | D11 | D10 | D9 | D8 |
| Byte 2 | M7 | M6 | M5 | M4 | M3 | M2 | M1 | M0 |
| Byte 3 | C3 | C2 | C1 | C0 | D | A2 | A1 | A0 |
| Byte 4 | P7 | P6 | P5 | P4 | P3 | P2 | P1 | P0 |

SYSTEM AND METHOD FOR TRANSMITTING HAPTIC DATA IN CONJUNCTION WITH MEDIA DATA

CROSS-REFERENCE TO RELATED APPLICATION

This application claims priority to U.S. Provisional Application Ser. No. 61/104,658 filed Oct. 10, 2008, entitled "System and Method For Transmitting Haptic Data In Conjunction With Media Data."

TECHNICAL FIELD

The present disclosure relates to a haptic output device configured to replicate or approximate sensations through the output of one or more mechanical forces, including sensations corresponding to sexual acts, and to coordinating the mechanical force output with one or more items of media.

BACKGROUND

As computing devices and communications networks have continued to mature, the content available to users has increased in both variety and complexity. Media products, i.e. audio and/or video, can be obtained in a wide-variety of formats, including on physical storage devices, e.g. compact disc (CD) and digital versatile disc (DVD), as data files that can be stored locally on a computing device, and as streaming files that can be transferred to a computing device for playback during streaming. The media products can be presented by the computing system in the form of both visual and auditory information.

Increased bandwidth in communications networks has permitted ever increasing amounts of data to be transmitted. As a result, the on-line media playback experience continues to offer additional functionality and enhanced features, such as on-demand playback and random access within an item of media content. Further, increases in the accuracy and efficiency of media encoding techniques have resulted in improved media quality, reduced errors, and higher data transfer rates. Thus, media broadcasters have been able to improve the quality and amount of content they offer to media clients over communications networks, such as the internet.

Increases in bandwidth and media encoding also have enabled home users to effectively transmit audio and/or video to other users, either directly or through an intermediate service. For instance, an inexpensive web camera (or webcam) can be used to capture and transmit video or video/audio to one or more other users. Thus, a video chat session can be conducted between multiple users, including users of mobile computing devices.

Haptic feedback (or haptic output) has been used to a limited extent in user input devices, such as touch screens, keyboards, computer mice, and joysticks. Basic haptic feedback can be purely mechanical, such as a clicking sensation experienced when a mouse button is depressed with sufficient force. Other devices can be configured to output haptic feedback through the use of electro-mechanical means, such as by activating and/or deactivating one or more motors. For instance, a vibratory sensation can be imparted to an input device, e.g. a joystick, by turning an electric motor on and off.

Haptic feedback also has been incorporated in video gaming applications, such as by including a computer controlled actuator in a controller. For example, a control surface, e.g., a button or pad, can be located near an actuator. Further, the actuator can output a tactile sensation based on the occurrence of an event, such as in response to a command signal from a game console.

SUMMARY

A user-interface device can be configured to output forces to generate haptic sensations (or sensations) corresponding to one or more real-world stimuli. A sensation can be represented using one or more forces, including friction, pressure, and vibration. Further, forces can be applied separately or as a combination of forces, e.g. to produce a complex sensation. A combination of forces can be structured such that there is at least some overlap between two or more of the forces included in the combination.

The present inventors recognized a need to permit mapping one or more forces to a real-world stimulus, such that the one or more forces mimic or approximate the sensation created by the real-world stimulus. Further, the present inventors recognized a need to utilize one or more forces, e.g. high-frequency vibration, to represent physically distinct stimulus, such as suction or vacuum. The present inventors also recognized a need to utilize interface surfaces to convey a sensation to a user, including one or more compliant belts, rollers, apertures, squeezing fingers, or pads. Additionally, the present inventors recognized a need to include one or more textures and/or surface features on an interface surface to create or enhance a sensation. The need to permit using heat and lubrication, separately or in combination, to create or augment the perception of one or more sensations also was recognized.

The present inventors also recognized a need to coordinate the generation of forces and presentation of sensations to correspond with one or more events occurring in a media presentation. The need to generate sensations that can cause a user to perceive that a depicted event is occurring to them also was recognized. Further, the need to use timing information to synchronize the generation of one or more haptic forces with a media event also was recognized. The timing information can be express timing information, such as a time stamp, or inherent timing information, such as the alignment of haptic data or a haptic command with a corresponding media event in a media file.

Further, the need to map a force or a combination of forces to a real-world stimulus was recognized. The present inventors also recognized the need to represent a force or combination of forces using a command or data structure. Additionally, the need to transmit haptic data, including haptic commands, over a communications network in conjunction with media data also was recognized. Accordingly, the techniques and apparatus described here produce forces that generate haptic sensations corresponding to real-world stimuli and can be coordinated with events depicted in an associated media presentation.

In general, a sensation output apparatus can include a processor adapted to generate one or more control signals corresponding to a haptic command, an actuator adapted to output a force to a drive mechanism in response to one or more control signals received from the processor, an opening through which a portion of a user's body can be inserted, and an interface surface coupled to the drive mechanism, the interface surface configured to at least partially contact the inserted portion of the user's body.

The sensation output apparatus also can be implemented such that the interface surface is a compliant belt coupled with a carrier belt, the carrier belt interfacing with at least a portion of the drive mechanism. Further, the sensation output apparatus can be implemented such that the carrier belt includes timing windows configured to receive teeth associated with the drive mechanism. Also, the sensation output apparatus can be implemented such that the compliant belt includes one or more surface features. Additionally, the sensation output apparatus can be implemented to include a heater, responsive to one or more control signals, configured to heat the interface surface.

The sensation output apparatus also can be implemented to include a lubrication system, comprising a lubrication reservoir including a lubricant, a lubrication pump, and an outlet port adjacent to the interface surface, the lubrication system being configured to output lubricant to the interface surface responsive to one or more control signals. Further, the sensation output apparatus can be implemented such that the actuator comprises a motor capable of bidirectional movement. Also, the sensation output apparatus can be implemented to include a second interface surface configured to at least partially contact the inserted portion of the user's body. The sensation output device further can be implemented to include a communication interface coupled to the processor and configured to receive haptic commands from an associated computing device. Additionally, the sensation output device can be implemented to include a memory coupled to the processor, the memory storing an algorithm comprising one or more haptic commands.

In general, in an aspect, a system can include a host computing system storing a media file having associated haptic data and a sensation output device coupled to the host computing system, the sensation output device including a processor configured to receive haptic data from the host computing system and to generate one or more control signals corresponding to the received haptic data, an actuator adapted to output a force to an interface surface in response to one or more control signals received from the processor, and an opening through which a portion of a user's body can be inserted.

The system also can be implemented such that the sensation output device further includes a wireless communication interface coupled to the processor, the wireless communication interface configured to communicate with the host computing system. Further, the system can be implemented such that the interface surface is a compliant belt including one or more surface features. Also, the system can be implemented such that the opening is an orifice having an actuator configured to drive a carrier gear in response to one or more control signals received from the processor; and a plurality of flexible extensions movably coupled to the carrier gear. Additionally, the system can be implemented such that the sensation output device further includes a sensor, coupled to the processor, wherein the sensor is capable of detecting a biometric reading associated with a sensation output device user.

In general, in another aspect, techniques for generating haptic forces can be implemented to include accessing a haptic command associated with an item of media content; generating one or more control signals corresponding to the accessed haptic command; and moving, by an actuator in a sensation output device, an interface surface in response to the one or more control signals; wherein the interface surface comprises a compliant belt configured to contact at least a portion of a user's body inserted into the sensation output device.

The techniques also can be implemented to include generating the one or more control signals in conjunction with presenting the item of media content. Further, the techniques can be implemented to include activating a lubrication system included in the sensation output device in response to the one or more control signals and dispensing lubricant from the lubrication system onto the interface surface. Also, the techniques can be implemented to include moving, by another actuator in the sensation output device, another interface surface in response to the one or more generated control signals. Additionally, the techniques can be implemented to include adjusting an orifice included in the sensation output device in response to the one or more generated control signals.

The techniques described in this specification can be implemented to realize one or more of the following advantages. For example, the techniques can be implemented such that real-world stimulus can be replicated or mimicked by one or more mechanically generated forces. Further, the techniques can be implemented such that the output of one or more haptic forces is coordinated with a corresponding event in a media presentation. The techniques also can be implemented to include operating the haptic output device independent of a corresponding media presentation, such as through one or more manual controls or through the execution of a sequence of programmed sensations.

Further, the techniques can be implemented to include encoding one or more items of haptic data, including haptic commands, in a media file, such as in a track. The haptic data can be retrieved and processed, e.g. by a media player, during playback of the media file to cause the output of forces associated with haptic sensations. The techniques also can be implemented such that haptic data, including haptic commands, can be stored in a separate file that can be separately distributed and accessed. The separate file can be associated with one or more media files, and also can include reference information, e.g. time stamps, to permit synchronization with an associated media file.

Additionally, the techniques can be implemented such that haptic data, including haptic commands, can be associated with a live media event, such as a streaming broadcast. The techniques also can be implemented such that authentication or authorization is required to enable an output device to generate forces in response to haptic commands or to access haptic data associated with an item of media.

The details of one or more implementations are set forth in the accompanying drawings and the description below. Other features and advantages will be apparent from the description and drawings, and from the claims.

BRIEF DESCRIPTION OF THE DRAWINGS

FIG. 10 shows an exemplary vector force command.

FIG. 11 shows an exemplary periodic command.

Like reference numbers and designations in the various drawings indicate like elements.

DETAILED DESCRIPTION

Figure 1:
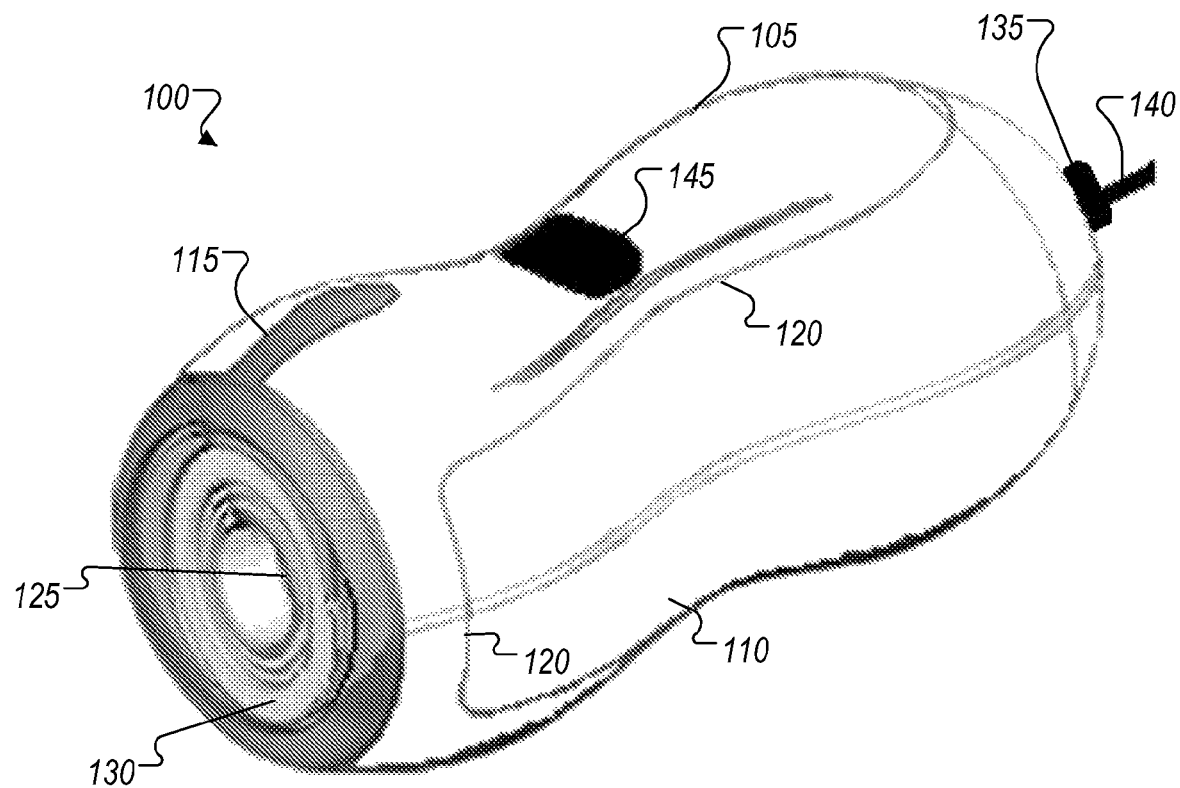
FIG. 1 shows an exemplary sensation output device.

FIG. 1 shows an exemplary sensation output device. The shape of the sensation output device 100 can be defined by an outer casing 105, which can be formed of a rigid material, e.g. plastic. The outer casing 105 can include contours 110 at one or more locations to assist with handling. Further, the outer casing 105 can include texture and/or surface features, e.g. textured region 115, in one or more locations to facilitate gripping. The sensation output device 100 also can be constructed of multiple, separable parts. For example, the outer casing 105 can include one or more seams 120 along which the outer casing 105 can be separated. Thus, at least a portion of the interior of the sensation output device 100 can be accessed by separating the outer causing 105. In some implementations, the outer casing 105 can including mating structures at the one or more seams 120 to securely join the parts of the outer casing 105.

An orifice 125 adapted to receive male genitalia also can be included in the outer casing 105 to provide access to an interior portion of the sensation output device 100. The orifice 125 can include a variable circumference that can be mechanically adjusted, e.g. by extending or retracting fingers (or extensions) positioned at the periphery of the orifice 125. The orifice 125 also can include a compliant barrier 130, e.g. constructed of latex of Versaflex™, adapted to cover the mechanical components and to interface with the male genitalia. In some implementations, the compliant barrier 130 can be molded to include an aperture simulating an anatomical feature, such as a vagina.

Further, the sensation output device 100 can include a power supply and communications interface 135. In some implementations, power and communications can be provided through a shared cable 140. In other implementations, separate power and communications cables can be coupled to the power supply and communications interface 135. The sensation output device 100 can be configured to use a variety of external power sources, including alternating current (AC) and direct current (DC) sources. Further, the sensation output device 100 can be configured to receive power from a computer interface, such as Universal Serial Bus (USB) or FireWire (IEEE 1394) interface. Alternatively or additionally, the sensation output device 100 can be configured to include a rechargeable power supply, including one or more batteries.

Bi-directional communications also can be transmitted over the communications interface 135. Control data, including haptic data, can be transmitted to the sensation output device 100 from a corresponding computing system. The control data can be supplied as input to control circuitry configured to control the operation of sensation output device 100. Further, manual commands received from one or more included controls, configuration data, and sensor data, including biometric data, can be transmitted from the sensation output device 100 to a corresponding computing system, such as the host computing system. The manual commands, configuration data, and sensor data can be formatted for transmission by the included control circuitry. In some implementations, the communications interface can be implemented as a wireless interface, e.g. using radio-frequency (RF) or infrared (IR) communications.

Additionally, the sensation output device 100 can include one or more controls adapted to receive input from a user. For instance, a control button 145 can be provided on the surface of the outer casing 105. The control button 145 can be a single purpose control, such as a power switch. Alternatively, the control button 145 can be a multi-purpose control, such as an intensity control that can receive input to increase or decrease the intensity of stimulation provided by the sensation output device 100. Further, the control button 145 can be insulated against liquid to reduce the risk of electric shock. Any number of controls, including buttons, dials, scroll wheels, and switches, can be included in the sensation output device 100. The included controls can be used to operate the sensation output device in a manual mode, such as by selecting a pre-configured stimulation program or by manually selecting one or more sensations.

The control circuitry (not shown) included in the sensation output device 100 can be configured to operate one or more of the included components. For example, the control circuitry can be configured to provide drive signals to one or more motors associated with the interface surfaces in response to one or more received control signals. In some implementations, motors can be independently driven forward or backward, including motors associated with the same interface surface. Further, one or more motors can be used to simultaneously drive multiple interface surfaces in the same direction or in opposing directions. The control circuitry can provide control signals, e.g. based on received commands, specifying the speed, direction, and duration for which a motor is to be operated. Further, the control circuitry can be configured to monitor the speed and/or position of a motor, such as through signals provided by a rotary encoder mounted to the motor shaft. Additionally, the control circuitry can determine the torque of a motor by monitoring the current flowing through that motor.

Figure 3:
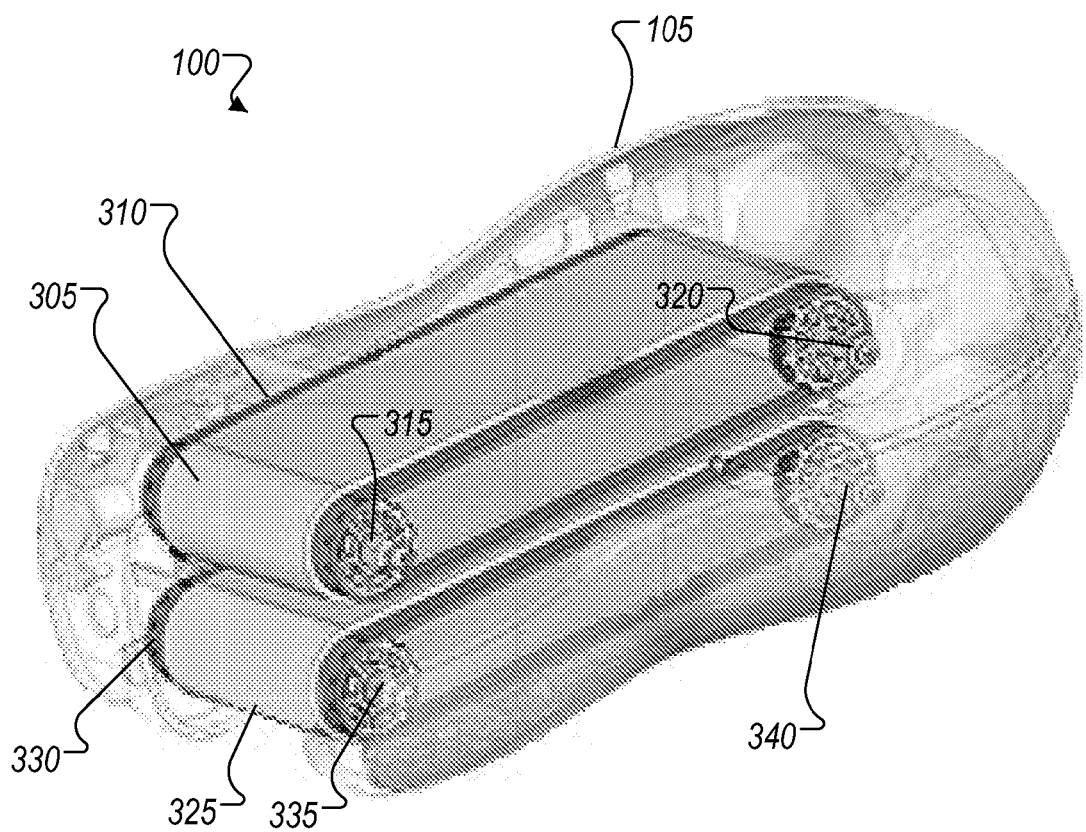
FIG. 3 shows an exemplary configuration of interface surfaces in a sensation output device.

In some implementations, a front motor and a back motor can be associated with an interface surface and a corresponding carrier belt, e.g. as shown in FIG. 3. In response to one or more received commands, the control circuitry can generate signals causing the front and back motors to be driven in different combinations, thereby producing different sensations. For example, one motor can be turned off as the other motor is driven to stretch and vibrate a corresponding interface surface. Alternatively, both motors can be driven in the same direction to roll the interface surface and produce a sensation of motion. The front motor and back motor also can be driven at different speeds. Further, a motor can be driven to generate a periodic force or a vector force.

A library of sensations can be defined based on the motion of an interface surface and the operation of one or more motors. A waveform can be used to define how a component, such as an interface surface, is to be actuated. The waveform can have any shape, including a sine wave, a square wave, and a saw-tooth wave. Further, multiple waveforms can be at least partially superimposed to generate a single complex sensation or a combination of sensations.

The sensation output device 100 also can include a microprocessor and memory configured to store a library of sensations. Storing data representing sensations, such as waveforms, in the sensation output device can reduce the bandwidth and power required for communication with a corresponding computing device, such as a host computing system. For example, each sensation in the library can be assigned a unique identifier. The computing device can then control the operation of the sensation output device 100 by indicating the identity of the sensations to be generated instead of transmitting data describing the sensation. In some implementations, the computing device can transmit the unique identifier for a sensation stored in the library or data describing the sensation for unique or new sensations.

Further, the sensation output device 100 can be configured to store each new sensation it receives, such that it can learn sensations and expand the stored library. Alternatively, the library of sensations can be periodically updated by the corresponding computing system. Additionally, when a library of sensations is stored locally, the sensation output device 100 can be configured to operate independently of the corresponding computing system, such as in a demonstration or manual mode. For example, the sensation output device can be configured to output a series of stored sensations in a predetermined or random order.

The sensation output device 100 also can include one or more sensors configured to generate environmental data, such as temperature, and/or user data, such as biometric data including heart rate and blood pressure. The data generated by the sensors can be provided to the control circuitry for transmission to the corresponding computing system. In some implementations, at least a portion of the electronics in the sensation output device 100, including the control circuitry, memory, and the communications interface, can be located in one or more separate housings to protect them from environmental factors, such as moisture, heat, and vibration.

Additionally, the control circuitry, including the processor, included in the sensation output device 100 can perform one or more safety and management functions. For example, if no commands and/or haptic data are received by the sensation output device for a predetermined period of time, the sensation output device can automatically shut itself off. The control circuitry also can be configured to monitor the amount of current drawn by a motor to detect a jam. If the current draw exceeds a predetermined amount, one or more fuses and/or transistors can be triggered to reset. Further, the use of power in the sensation output device can be managed to ensure that power is available for essential functions. For example, the functions performed by the sensation output device can be classified as essential functions, such as generating sensations and communicating, and non-essential functions, such as heating and dispensing lubrication.

The control circuitry can monitor the consumption of power during operation of the sensation output device 100. As long as sufficient power is available, all functions can be performed. Once the demand for power exceeds, or could exceed, a predetermined threshold, one or more non-essential functions can be suspended. For example, device heating can be terminated. After the demand for power decreases and sufficient power is once again available for all functions, non-essential functions can be resumed.

Figure 2:
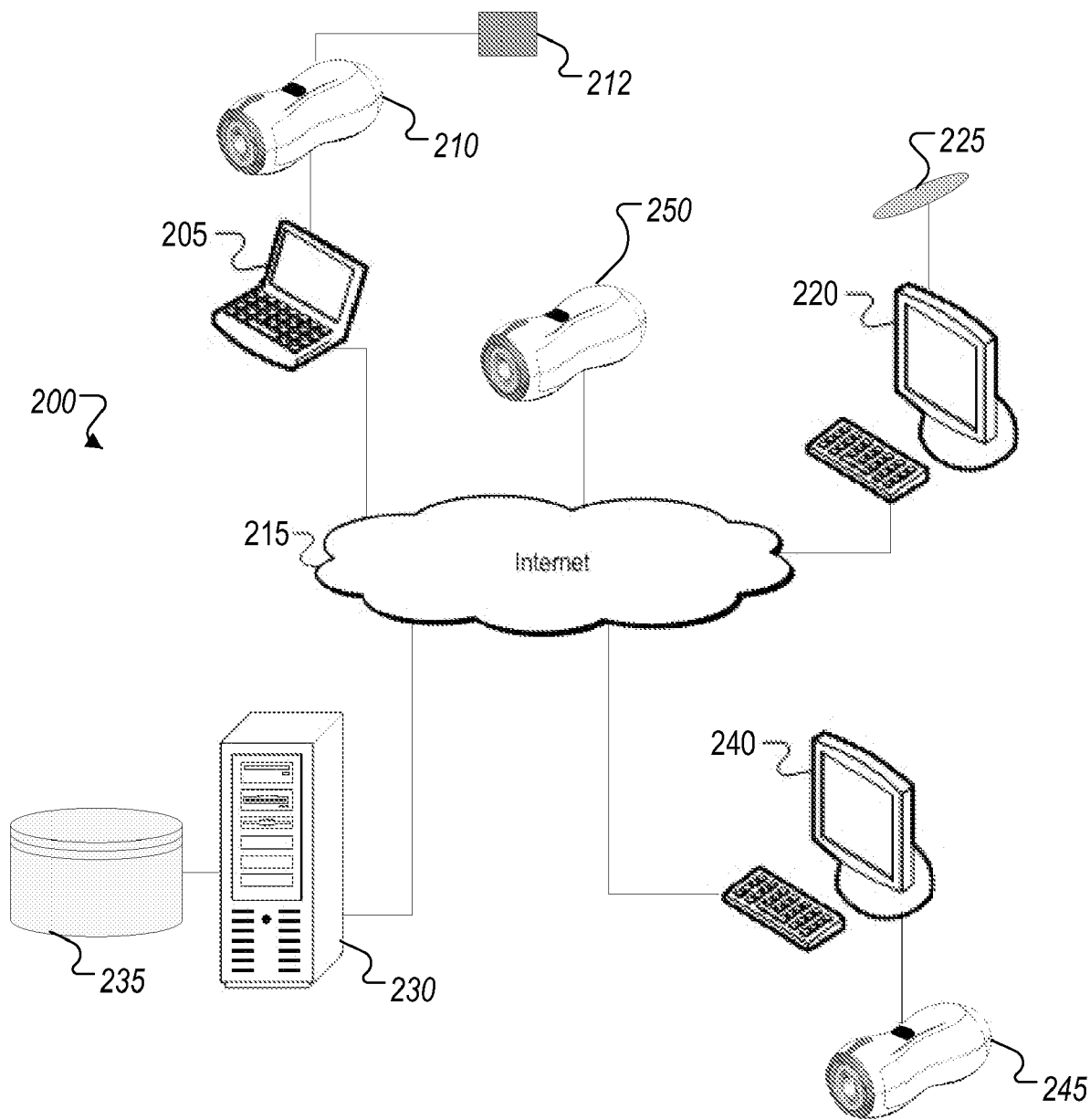
FIG. 2 shows an exemplary networked computing system, including sensation output devices.

FIG. 2 shows an exemplary networked computing system, including sensation output devices. The computing system 200 includes a host computing system 205 that can be coupled to a network 215 through a wired or wireless connection. The host computing system 205 can be any computing platform, including a laptop, desktop, palm top, server, work station, or other such computer. The host computing system 205 can include a processing unit, one or more output devices, such as displays and/or speakers, and one or more input devices, such as a keyboard, mouse, joystick, track ball, touch pad, touch screen, and/or microphone.

The host computing system 205 also can be configured to execute one or more playback applications for outputting media data, such as audio, video, or audio/video, to a display and/or speakers. Further, the host computing system 205 can output signals representing haptic data, such as haptic (or touch sensation) commands, to a sensation output device 210. The haptic data signals can be coordinated with the media data, such that the sensation output device 210 outputs a particular sensation in conjunction with the presentation of a corresponding media event. In some implementations, a single playback application, e.g. Windows Media Player, produced by the Microsoft Corporation can be configured to output media data and haptic data. In some other implementations, a media playback application can be configured to output media data and a separate haptic playback application can be configured to output corresponding haptic data. The media playback application and the haptic playback application can be synchronized such that corresponding media and haptic events are presented substantially simultaneously.

The sensation output device 210 (or host device) can be coupled to the host computing system 205 through a wired or wireless interface. For example, the interface can be configured as a USB, FireWire, Wi-Fi, Bluetooth, or other such interface. In some implementations, power can be supplied to the sensation output device 210 from the host computing system 205. The sensation output device 210 can receive signals from the host computing system 205, including signals representing haptic data (also referred to as sensation or touch data). Additionally, the sensation output device 210 can generate one or more output sensations based on the haptic data, which can be presented to a user as one or more physical stimuli. In some implementations, the haptic data can be represented as one or more waveforms that define characteristics of a force, including a period, an amplitude, an attack, and a decay. Further, the haptic data can specify one or more actuators that are to generate the forces.

In some implementations, the sensation output device 210 can communicate bi-directionally with the host computing system 205. For example, input received by one or more sensors and/or user controls associated with the sensation output device 210 can be transmitted as sensation output device data over the interface between the sensation output device 210 and the host computing system 205. Sensation output device data received by the host computing system 205 can be stored and/or forwarded to one or more other computing systems over the network 215, such as a server or a source computing system. The one or more sensors associated with the sensation output device 210 can be configured to collect biometric data, such as blood pressure, heart rate, and temperature. Further, the one or more sensors also can be configured to collect user actions, such as gripping, touching, or manipulating the sensation output device. Additionally, the one or more user controls can be configured to receive user input and commands, such as actions to be performed or parameter setting adjustments.

The sensation output device 210 also can be configured to provide an identifier that can be used for identification, authorization, and verification functions. In some implementations, circuitry included in the sensation output device 210 can be programmed with a unique identifier. Further, the identifier can be static, such as a serial number, or variable, such as a code generated based on an algorithm. Additionally, operation of the sensation output device 210 can be restricted or disabled based on the identifier. For example, a playback application executing on the host computing system 205 can be configured to request the identifier before outputting haptic data signals to the sensation output device 210. If the identifier cannot be validated or has been restricted, e.g. for non-payment, the host computing system 205 can prevent the presentation of haptic data signals to the sensation output device 210. In some implementations, the playback application, the host computing system 205, or the sensation output device 210 also can be configured to communicate the identifier to a server, such as during an authentication operation.

Additionally, a remote control 212 also can be connected to the sensation output device 210. The remote control 212 can include one or more controls, e.g. knobs, buttons, switches, and rheostats, configured to transmit control signals to the sensation output device 210. Thus, the sensation output device 210 can be manually operated and controlled by the remote control 212.

The network 215 can be a public network, such as the Internet, a private network, such as a local area network (LAN), or a combination thereof. Further, the network 215 can include any combination of wired and wireless links. In some implementations, the network 215 can be configured to transmit data using a plurality of protocols. Additionally, the network 215, or a portion thereof, can be configured to support the transmission of audio, video, and/or haptic data in real-time.

A source computing system 220 also can be coupled to the network 215 through a wired or wireless connection. As with the host computing system 205, the source computing system 220 can be any computing platform, including a laptop, desktop, palm top, server, work station, or other such computer. A sensation input device 225 (or source device) can be coupled to the source computing system 220 through a wired or wireless interface. For example, the interface can configured as a USB, FireWire, Wi-Fi, Bluetooth, or other such interface. In some implementations, power can be supplied to the sensation input device 225 from the source computing system 220.

The source computing system 220 also can be configured to execute one or more sensation capture applications for generating signals and/or commands representing haptic data based on signals received from the sensation input device 225. For example, sensor data received from the sensation input device 225 can be automatically converted into one or more items of haptic data, e.g. by a sensation capture application. Further, a sensation capture application can be configured to encode haptic data signals into a media stream or file based on sensor signals received from a sensation input device 225. Additionally, a sensor capture application can transmit haptic data signals and/or content including haptic data signals to a remote computing system, such as a server or a host computing system.

The sensation input device 225 can include one or more sensors configured to generate sensor signals representative of physical manipulation, including touch, gripping, movement, orientation, and stroking. For instance, the sensation input device 225 can be adapted to be inserted into and extracted from a human user, e.g. orally, vaginally, and/or anally. Sensor signals can be generated during the insertion/extraction. In some implementations, the sensation input device 225 also can include one or more sensors configured to generate sensor signals representative of environmental conditions, including temperature and pressure (positive and negative). The sensor signals can be transmitted from the sensation input device 225 to the source computing system 220. Sensor signals received by the source computing system 220 can be stored and/or forwarded to one or more other computing systems over the network 215, such as a server or a host computing system. Other signals, such as audio and/or video signals, also can be captured by the source computing system 220 along with the sensor signals received from the sensation input device 225. For example, one or more cameras and/or microphones can be coupled to the source computing system 220. The sensor signals can be associated with the contemporaneously received audio/video signals, such that all of the associated signals can be presented simultaneously or substantially simultaneously during playback.

In some implementations, the sensation input device 225 can communicate bi-directionally with the source computing system 220. For example, the sensation input device 225 can receive signals representing haptic data from the source computing system 220. Additionally, the sensation input device 225 can be configured to generate one or more output sensations based on the received haptic data, which can be presented to the sensation input device 225 operator as one or more physical stimuli.

The sensation input device 225 also can be configured to provide an identifier that can be used for identification, authorization, and verification functions. In some implementations, circuitry included in the sensation input device 225 can be programmed with a unique identifier. Further, the identifier can be static, such as a serial number, or variable, such as a code generated based on an algorithm.

A server 230 also can be coupled to the network 215 through a wired or wireless connection. The server 230 can be any suitable computing architecture, including single processor and multi-processor architectures. The server 230 can be configured to provide content, including applications and data, to one or more client systems, such as the host computing system 205. Further, the server 230 can be configured to receive content, including sensor signals and other data, from one or more provider systems, such as the source computing system 220. Additionally, the server 230 can be configured to facilitate connections between a plurality of computing systems communicating on the network 215, such as the host computing system 205 and the source computing system 220. For example, the server 230 can present a directory of services and can facilitate access to those services, including performing authentication and payment collection.

A media database 235 can be coupled to the server 230, such as through a dedicated connection or a networked connection. The media database 235 can be configured to store one or more media products available for purchase and/or rental, including media products containing audio, video, and haptic data. Further, the media database 235 can be configured to store data received from one or more source devices, such as the source computing system 220. For example, the media database can be configured to store audio data, video data, and/or sensor signals received from one or more sources. Further, the received sensor signals can be stored as haptic data.

One or more other sensation output devices also can be coupled to the network 215. For example, a second sensation output device 245 can be coupled to a second host computing system 240. The second host computing system 240 and second sensation output device 245 can receive, at substantially the same time, content similar to that being provided to the host computing system 205 and sensation output device 210, such as in a broadcast model. Alternatively, the second host computing system 240 and second sensation output device 245 can independently receive content from a server or a source computing system, such as in a unicast model. In each implementation, the content can include any combination of audio, video, and haptic data.

In some implementations, signals representing haptic data can be transmitted to a recipient, such as the host computing system 205, in conjunction with audio and/or video signal data. For example, haptic data can be organized as one or more tracks (or layers) of data corresponding to an item of content, which further can include one or more tracks of audio and/or video data. Further, the tracks of the item of content can be synchronized, such that haptic data is linked with corresponding video and/or audio data. In some other implementations, signals representing haptic data can be stored separately from corresponding audio and/or video data. For example, the haptic data can be stored in a separate file that can be accessed by a host computing system and used to augment corresponding audio and/or video data during playback. Thus, audio and/or video data can be processed, such as through mixing, encoding or compression, without altering the haptic data. The haptic data can be synchronized with the audio and/or video data for playback, e.g., using associated timing data or markers. Alternatively, the haptic data can be accessed separately by a host computing system or a sensation output device to generate one or more output sensations, which can be presented to a user as one or more physical stimuli without the corresponding presentation of audio and/or video output.

Additionally, a stand-alone sensation output device 250 can be coupled directly to the network 215, such as through a wired or wireless connection. For example, the stand-alone sensation output device 250 can be Wi-Fi or Bluetooth enabled, such that it can receive signals, including haptic data, over the network 215. The signals representing haptic data, such as touch sensation commands, can be received from a server or source computing system. In some implementations, the stand-alone sensation output device 250 also can be configured to transmit one or more signals over the network 215, such as to a server or a source computing system. The stand-alone sensation output device 250 further can include one or more sensors and/or controls, including controls configured to receive input from a user, such as to identify a source of haptic data to be accessed. Additionally, haptic data received by the stand-alone sensation output device 250 can be synchronized with video and/or audio data provided to one or more other devices, including a computing system, television, mobile communication device, or other such presentation device.

The sensation output device 100 can include one or more interface surfaces arranged to contact a portion of the body, e.g. a penis, inserted through the orifice. The interface surfaces can be positioned to make contact at one or more locations along the skin, and can be realized using any structure or combination of structures, including one or more belts, rollers, and/or pads. FIG. 3 shows an exemplary configuration of interface surfaces in a sensation output device. The interface surfaces can include an upper belt 305 and a lower belt 325, which can be positioned in any manner, including in alignment, in partial alignment, or opposed to one another. The upper belt 305 and the lower belt 325 can be constructed from a compliant material, such as latex or a thermoplastic elastomeric material. Either or both of the upper belt 305 and lower belt 325 can include one or more textured regions arranged in any pattern along the surface of the belt. A texture can be selected to provide a sensation mimicking an anatomical region, such as a mouth or a vagina. One or more textures also can be arranged in a pattern to impart a sensation such as rotation when the interface surface is moved linearly. Further, either or both of the upper belt 305 and lower belt 325 can include one or more surface features, such as ridges, bumps, grooves, dimples, or raised areas.

In some implementations, either or both of the upper belt 305 and the lower belt 325 can be mounted on a removable framework, such as a cartridge adapted to interface with the sensation output device. Thus, the upper belt 305 and the lower belt 325 can be removed from the sensation output device for cleaning and/or maintenance. Also, the framework including the upper belt 305 and the lower belt 325 can be replaced with a framework containing different interface surfaces, e.g. belts, rollers, and/or pads, such as to provide different capabilities and sensations. Further, the removable framework can be enclosed, such that the upper belt 305 and the lower belt 325 and associated drive mechanics are isolated from the other components of sensation output device. One or more drive interfaces of the sensation output device, e.g. gears and/or drive shafts, can contact corresponding drive mechanisms on the removable framework to transfer drive forces. Additionally, one or more electrical contacts on the sensation output device can interface with corresponding contacts on the removable framework to transfer signals and/or power.

The upper belt 305 can be coupled with an upper carrier belt 310 and the lower belt 325 can be coupled with a lower carrier belt 330. A belt and a corresponding carrier belt can be detachably or fixedly coupled, with the carrier belt serving as a support structure for the belt. The upper and lower carrier belts 310 and 330 can be constructed from one or more non-compliant materials adapted to transmit torque from an actuator or drive mechanism. The one or more non-compliant materials can be sufficiently strong to withstand tearing when driven.

The upper carrier belt 310 can be mounted on a front axle assembly 315 and a rear axle assembly 320. The front and rear axle assemblies 315 and 320 can include timing pulleys having teeth aligned to interface with openings (or timing windows) along the peripheral edges of the upper carrier belt 310. Alternatively, the upper carrier belt 310 can interface with the front and rear axle assemblies 315 and 320 through other means, such as tension. The lower carrier belt 330 also can be mounted on a front axle assembly 335 and a rear axle assembly 340, which can include timing pulleys having teeth that interface with holes along the peripheral edges of the lower carrier belt 330.

One or more actuators can be connected to either or both of the front and rear axle assemblies 315, 320 and 335, 340. An actuator can be a rotary actuator, such as a DC motor, or a linear motor (or linear induction motor). Further, an actuator can be a low-acceleration or a high-acceleration actuator. In some implementations, a pair of disparate actuators can be connected to corresponding front and rear axle assemblies to provide for the application of different forces. The pair of disparate actuators can be operated individually and/or at the same time. Further, one or more actuators can be used to drive the upper belt 305 and upper carrier belt 310, and the lower belt 325 and lower carrier belt 330 in the same direction or in different directions at the same rate and/or at different rates. Further, the upper belt 305 and upper carrier belt 310, and the lower belt 325 and lower carrier belt 330 can be operated at the same time or independently.

An intermediate drive stage (not shown) also can be positioned between, and used to connect, a carrier belt and a corresponding actuator. The intermediate drive stage can feature a mechanical drive ratio configured to amplify the drive force of the actuator. The intermediate drive stage can be constructed from one or more of a timing belt and pulleys, one or more gears, and a cable or tape drive. Additionally, one or more interface surfaces, including corresponding carrier belts, can be manually advanced through a user control, such as a wheel, disc, knob, or lever, to permit cleaning and/or maintenance.

Figure 4:
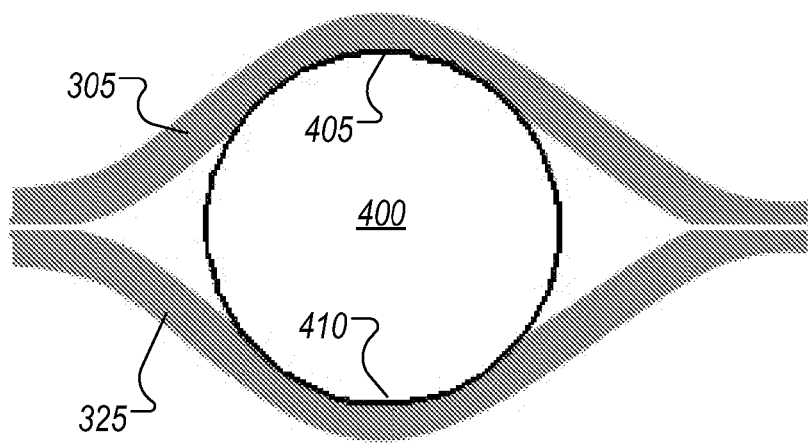
FIG. 4 shows an example of interface surfaces contacting a body.

A corporeal member, such as the penis, can be inserted between interface surfaces and/or can be contacted at multiple points by a single interface surface, such as a wrapped or serpentine interface surface. The one or more interface surfaces can accommodate members of varying sizes and can contact different members to different degrees. FIG. 4 shows an example of interface surfaces contacting a body. In some implementations, the interface surfaces can be belts, such as an upper belt 305 and a lower belt 325. In some other implementations, one or more other interface surfaces can be used in addition to or in place of belts, such as rollers, pads, or plates. In FIG. 4, a cross-section of a portion of the body, such as the penis, is shown inserted between the upper belt 305 and the lower belt 325, such that the upper portion of the penis 405 and the lower portion of the penis 410 are contacted by the corresponding interface surface. The upper belt 305 and the lower belt 325 can be separated to prevent them from coming into contacting when they are at rest and when they are in operation. Further, the upper belt 305 and the lower belt 325 can be positioned in close proximity to contact a significant portion of the penis. Because the interface surfaces are constructed of a compliant material, they will conform, at least partially, to an object inserted between them.

Figure 5:
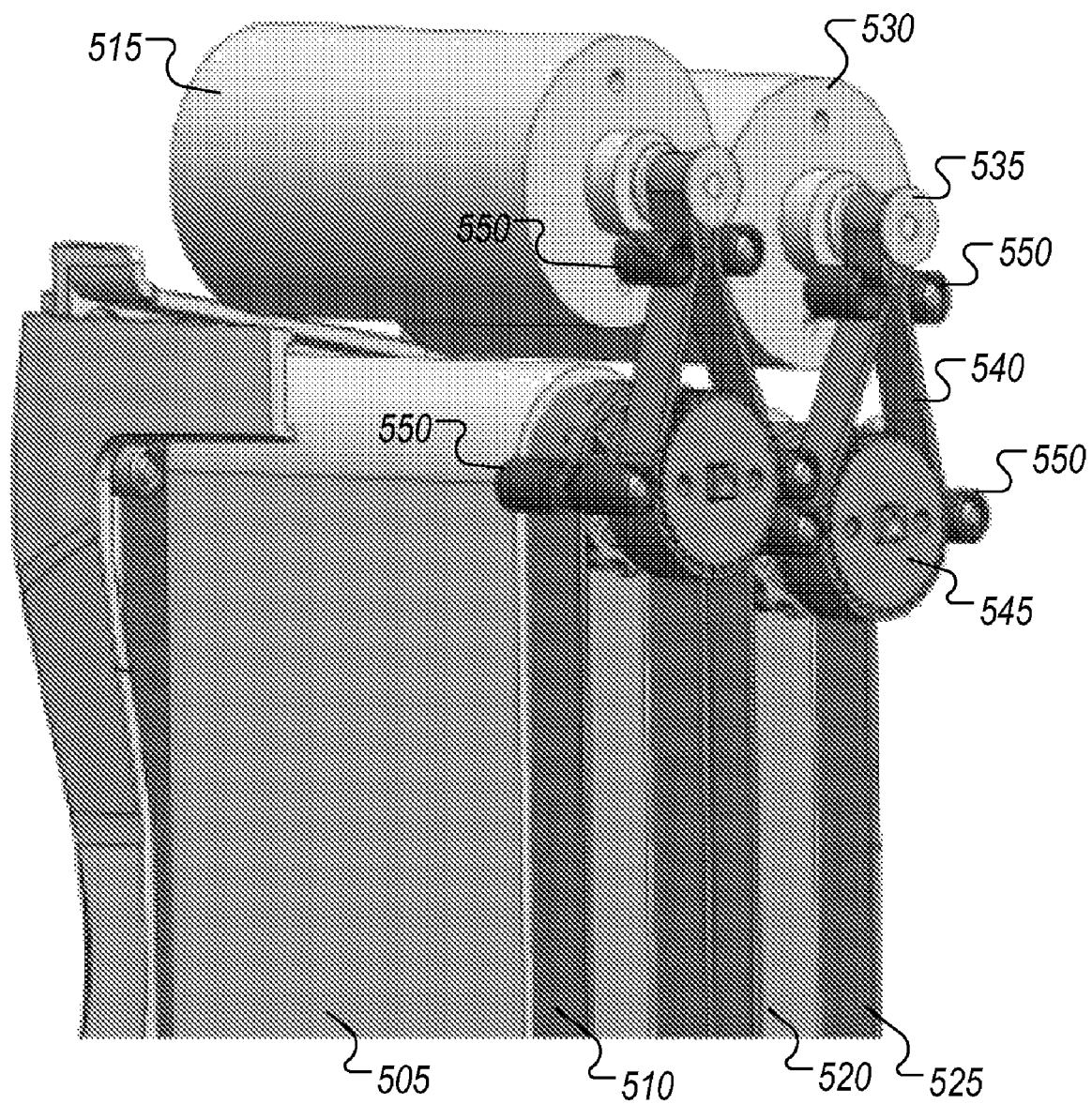
FIG. 5 shows an exemplary drive configuration for a pair of belts.

FIG. 5 shows an exemplary drive configuration for a pair of belts. An upper interface surface assembly includes an upper belt 505 and an upper carrier belt 510, which can be driven by an upper actuator 515. Similarly, a lower interface surface assembly includes a lower belt 520 and a lower carrier belt 525, which can be driven by a lower actuator 530. The upper actuator 515 and the lower actuator 530 each can be any suitable electrical or electro-mechanical actuator, such as a rotary motor or a linear actuator. Further, the upper and lower interface surface assemblies can include identical components and can be configured to operate in a similar manner. Thus, only the lower interface surface assembly is described.

The lower actuator 530 includes a drive pulley 535 mounted on a drive shaft which can be rotated in one direction or in either of two directions, i.e., forward and backward. A drive belt 540 can connect the drive pulley 535 and pulley 545, such that the pulley 545 can transfer the torque generated by the lower actuator 530 to the lower carrier belt 525. Further, the pulley 545 can be sized to amplify the torque. In some implementations, the drive belt 540 can include gears, which can interface with teeth included in either or both of the drive pulley 535 and the pulley 545. Additionally, idler wheels 550 can be included at points along one or more of the belts to maintain the alignment and positioning of the belts. For example, one or more idler wheels 550 can be placed adjacent to a pulley to prevent a corresponding belt from derailing. The one or more idler wheels 550 also can be positioned to prevent or reduce contact with the corresponding belt during normal operation in order to decrease or eliminate friction.

Figure 6:
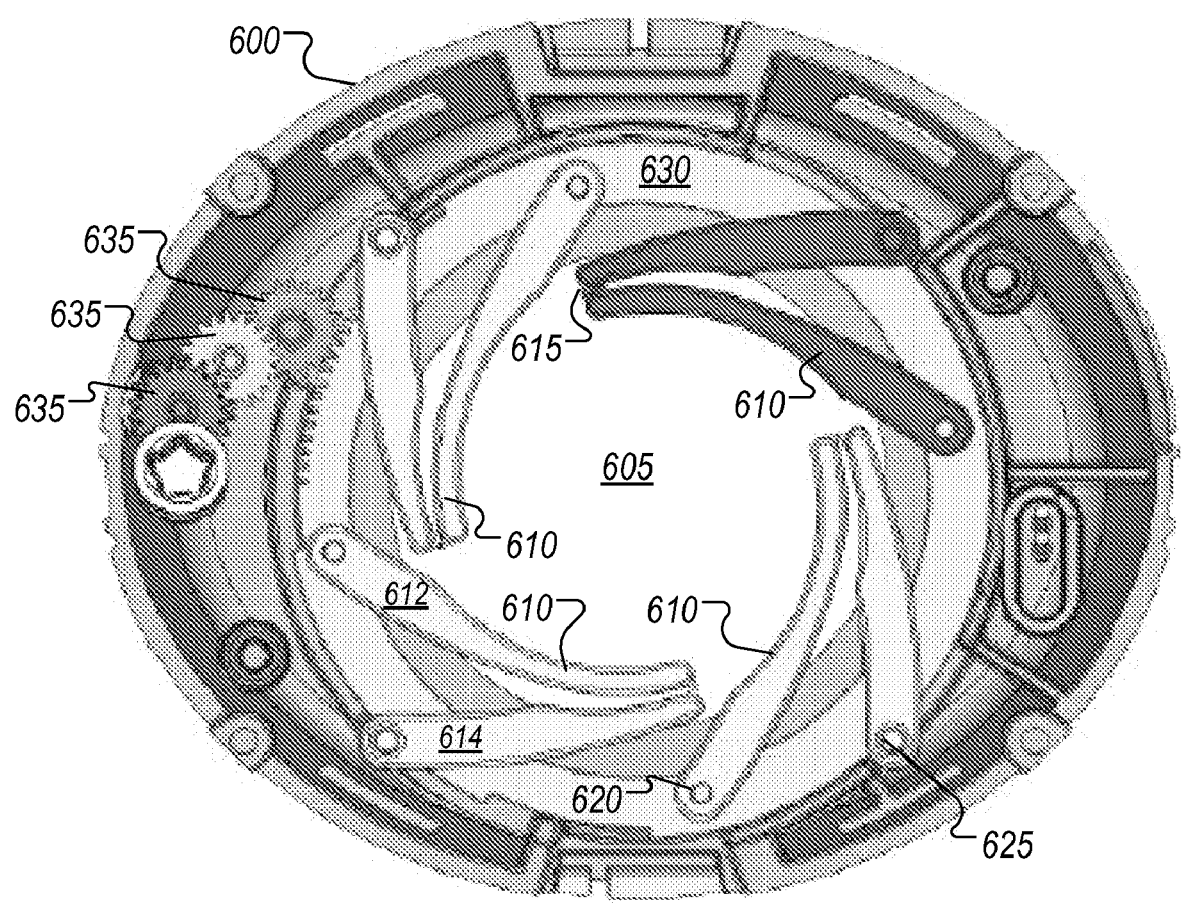
FIG. 6 shows an exemplary orifice assembly including flexible fingers.

FIG. 6 shows an exemplary orifice assembly including flexible fingers (or extensions). The orifice assembly 600 can be included in the sensation output device to provide a dynamically adjustable opening 605 through which a portion of the body, such as the penis, can be inserted. The size of the opening can be adjusted in response to one or more haptic commands, such as commands to decrease the size of the opening 605 and thereby apply pressure to an inserted penis. Alternatively or additionally, the size of the opening 605 can be expanded or contracted in response to user input, such as one or more configuration commands.

A number of flexible fingers 610 can be arranged around the circumference of the opening 605. In some implementations, each flexible finger 610 can be constructed of an inner protrusion 612 and an outer protrusion 614 that are connected at one end by a hinge 615, which allows the inner and outer protrusions 612, 614 to move relative to one another to decrease or increase the size of the opening 605. Further, the inner protrusion 612 of each flexible finger 610 can be connected to a carrier gear 630 through a rotary connection 620 and the outer protrusion 614 of each flexible finger 610 can be connected to the orifice assembly 600 through a hinged connection 625. Thus, when the carrier gear 630 is rotated, the flexible fingers 610 can be caused to move toward the opening 605, thereby decreasing its size, or to move away from the opening 605, thereby increasing its size. The carrier gear 630 can be driven by one or more gears 635, which in turn can be driven by an actuator. The ratio and arrangement of the one or more gears 635 can be selected to magnify the force applied by the flexible fingers 610. Additionally, the orifice assembly 600, including the flexible fingers 610, can be partially or completely enclosed by a compliant cover (not shown), which can contact the user's body. The compliant cover can be formed or molded from a compliant material, such as latex or a thermoplastic elastomer.

Figure 7:
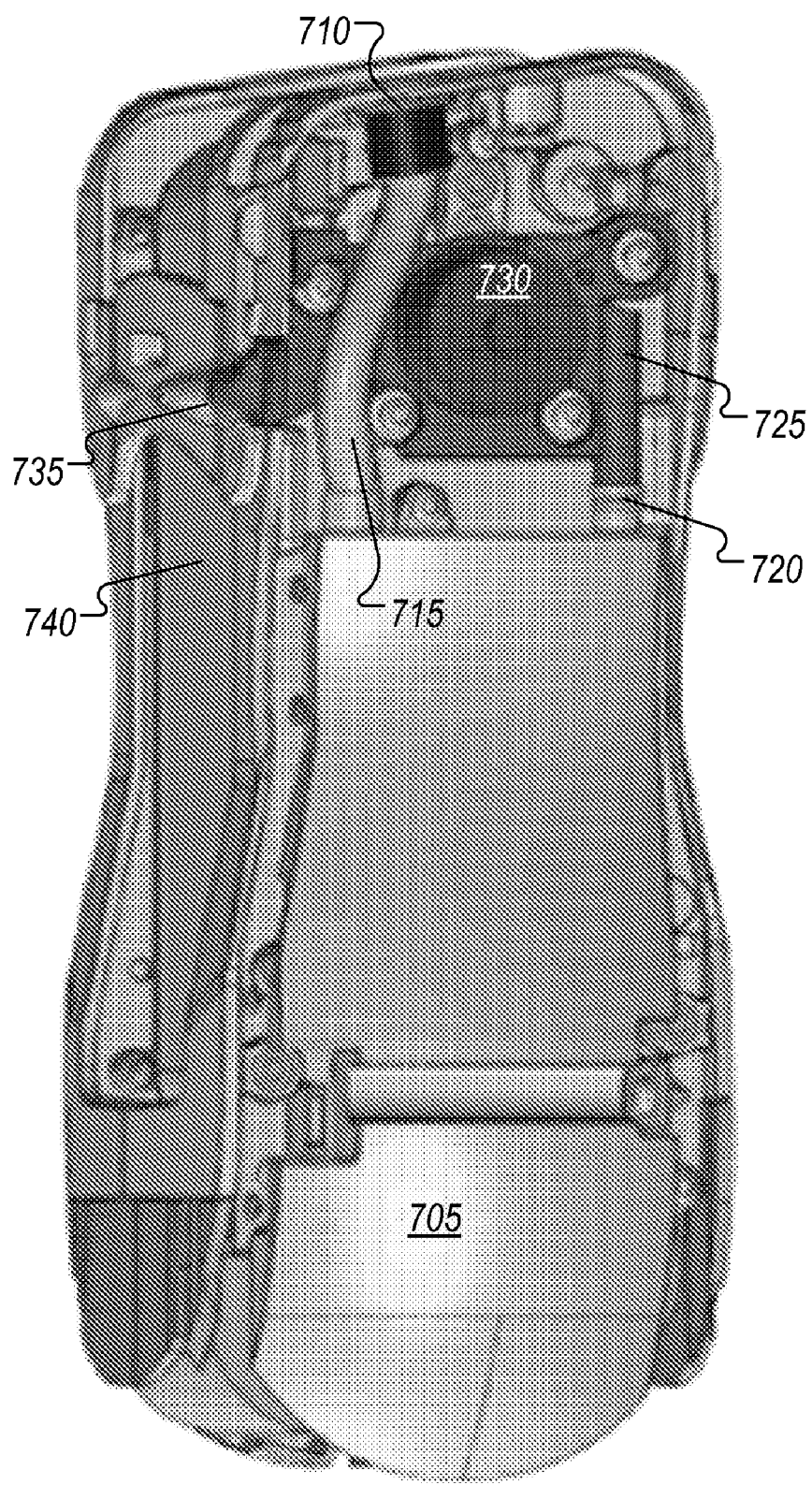
FIG. 7 shows an exemplary lubrication system included in the sensation output device.

FIG. 7 shows an exemplary lubrication system included in the sensation output device. In some implementations, the lubrication system can be housed entirely within the outer casing of the sensation output device. In some other implementations, one or more portions of the lubrication system, e.g. a lubrication reservoir 705, can be external to, or can form a portion of, the outer casing. The lubrication reservoir 705 can be sized to hold enough lubricant for at least one use and possibly for multiple uses, such as having a capacity of 1 to 4 ounces. The lubrication reservoir 705 can be filled by inserting lubricant into a lubrication fill opening 710, which can be sealed, e.g., by an integrated gasket or a removable cap. A fill tube 715 can connect the lubrication fill opening 710 and the lubrication reservoir 705.

The lubrication reservoir 705 also can include an outflow tube 720, which can be connected to a pump housing 725. Further, the pump housing 725 can include one or more inlet flow paths configured to transfer lubricant from the outflow tube 720 to a lubrication pump motor 730. The lubrication pump motor 730 can be operated in response to one or more commands, including commands received from an external source, such as a host computing system. Operating the lubrication pump motor 730 can serve to draw lubricant from the lubrication reservoir 705. The lubrication pump motor 730 can be any fluid pump adapted to transfer lubricant. In some implementations, the lubrication pump motor 730 can include one or more rotating gears, which can draw fluid in through a pump inlet and expel fluid through a pump outlet. Further, the pump housing 725 can include one or more outlet flow paths configured to transfer lubricant from the lubrication pump motor 730 to an outlet port 735. The outlet port 735 can be positioned adjacent to an interface surface, e.g. a compliant belt, such that lubricant can be expelled from the outlet port 735 onto the interface surface.

Alternatively, the lubrication reservoir 705 can be configured to dispense lubricant onto one or more interface surfaces without the use of a lubrication pump. For example, in some implementations, lubricant can be dispelled from the lubrication reservoir 705 through gravitational flow. In other implementations, lubricant can be pumped from the lubrication reservoir 705 by user input to a mechanical pumping mechanism. In still other implementations, lubricant can be drawn from the lubrication reservoir 705 by the motion of an interface surface or in response to force supplied by an actuator configured to drive an interface surface.

Additionally, the lubrication system can include a heater adapted to warm the lubricant. The heater can be positioned adjacent to the lubrication reservoir 705 or can be constructed as part of the lubrication reservoir 705. Alternatively, one or more heating elements can be included inside of the outer casing of the sensation output device. For example, a heating element can be arranged near an interface surface, such that the temperature of the interface surface can be gradually and consistently raised. Further, the one or more heating elements can be positioned such that they cannot be directly contacted by an object inserted into the stimulation output device, such as a penis. The heating elements can be any heating device known in the art, including thin film, radiant heating elements. The heating elements can be controlled by one or more commands received by the sensation output device, including commands received from an external source, such as a host computing system. Additionally, one or more temperature sensors can be included in the sensation output device to provide data indicating an internal temperature to control circuitry of the sensation output device and/or to an external computing device. Thus, operation of the heating elements can be controlled such that the internal temperature does not exceed a predetermined threshold, e.g. 104 degrees Fahrenheit.

Figure 8:
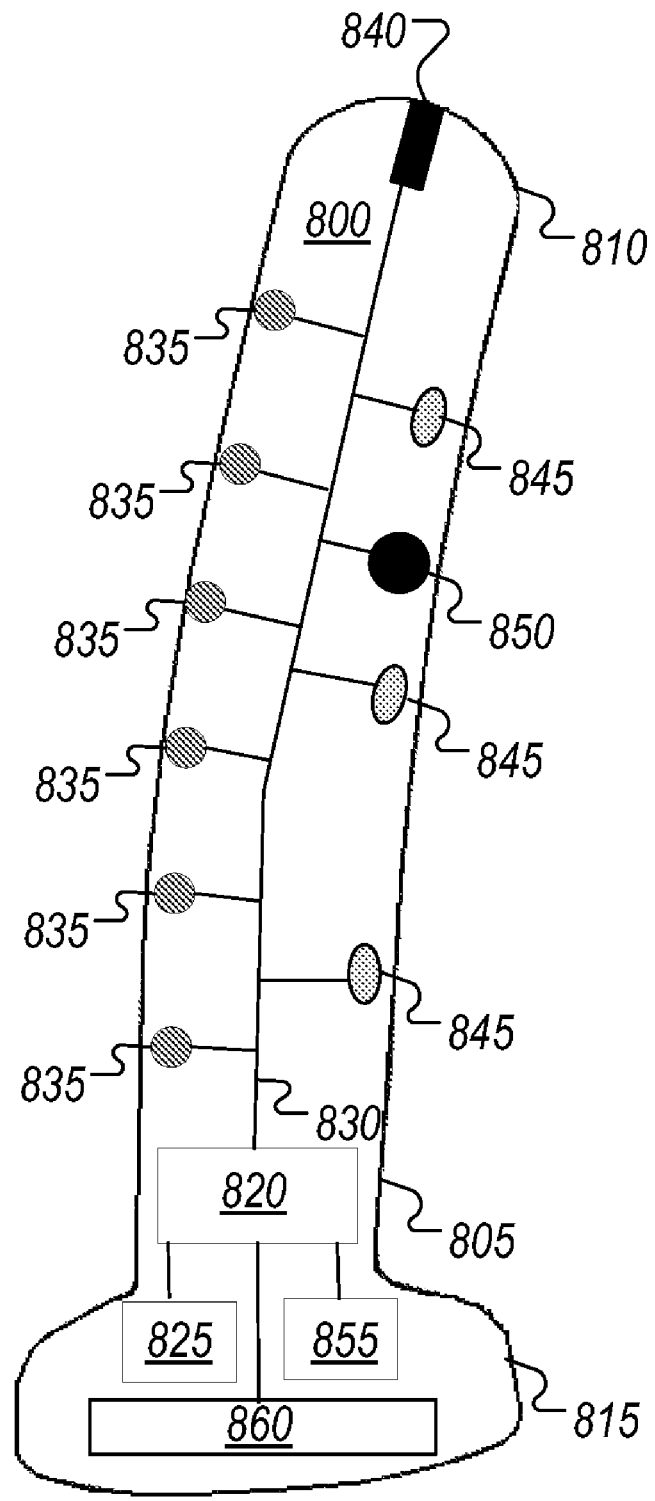
FIG. 8 presents an exemplary sensation input device.

FIG. 8 presents an exemplary sensation input device. The shape of the sensation input device 800 is defined by an outer casing 805, which can be rigid, semi-flexible, or flexible. The outer casing 805 can be sized and shaped such that it can be hand-held and physically manipulated by an operator. Also, the outer casing 805 can be water-proof or water-resistant, such that the sensation input device can be inserted into an operator, e.g. orally, vaginally, or anally. In some implementations, the outer casing 805 can be contoured and rounded at one end 810 and can include a base 815 or other such gripping region at the other end. In some other implementations, the outer casing 805 can be contoured and rounded at both ends. The outer casing 805 also can include texture and/or surface features (not shown) in one or more locations to facilitate gripping and manipulation. For instance, the outer casing 805 can include surface features such as ribbing, protrusions, and bumps.

The sensation input device 800 also can include processing circuitry and multiple sensors. For instance, a processor 820 adapted to receive data from one or more sensors can be embedded inside of the sensation input device 800. The processor 820 can be coupled with a communication interface 825, which can be configured to communicate with one or more external computing devices or an associated cradle. In some implementations, the communications interface 825 can be a wired interface, such as a USB or FireWire interface. In some other implementations, the communications interface can be a wireless interface, such as an RF or an IR interface. The processor 820 included in the sensation input device 800 can provide sensor data, including light, gas pressure, tactile, and inertial data, to the communication interface 825, which can then transmit the sensor data to a computing device, such as a source computing system. In some implementations, the communication interface 825 can be configured to implement bidirectional communications. The sensor data communicated to the computing device or cradle can be used to determine what actions are being performed on the sensation input device 800 and how it is being manipulated. Further, one or more applications executing on the computing device can generate haptic data representing physical sensations based on the received sensor data. Also, the communication interface 825 can be configured to receive one or more signals, including commands, from the computing device or the associated cradle.

One or more light sensors 835 (or photo detectors) can be arranged along one or more axes of the sensation input device 800, such as at a regular interval. In some implementations, the light sensors 835 can be disposed along most or all of the length of the sensation input device 800. In other implementations, the light sensors 835 can cover only a partial length of the sensation input device 800. The light sensors also can be distributed around the circumference of the sensation input device 800. Light sensor data generated by one or more of the light sensors 835 can be transmitted over a bus interface 830 to the processor 820. In some implementations, sensors in the sensation input device 800, including the light sensors 805, can be mounted to a flexible substrate that incorporates the bus interface 830.

The light sensor data can be transmitted from the sensation input device 800 to a corresponding computing system, which can determine the locations at which the sensation input device 800 is being covered and the degree to which the sensation input device 800 is covered or exposed, such as during manipulation or insertion/extraction. The light sensor data can be transmitted through the communication interface 825. Further, the rate at which the light sensor data from the light sensors 835 changes can be used to determine the rate at which the sensation input device 800 is being covered or exposed. For example, based on the light sensor data, it is possible to determine both the extent to which the sensation input device 800 is being inserted into or extracted from an orifice, and the rate at which the insertion or extraction is occurring. As a result, haptic data, including one or more haptic commands, can be generated to replicate and/or mimic aspects of the sensation input device 800 manipulation. In some implementations, the haptic data can be generated by the processor 820 in the sensation input device 800 and transmitted to a computing device or cradle over the communication interface 825. In some other implementations, the haptic data can be generated by an external computing device that receives sensor data from the sensation input device 800.

One or more other sensors also can be included in the sensation input device 800. A gas pressure sensor 840, e.g. a barometric altimeter, can be used to determine positive and negative pneumatic pressure, applied to the sensation input device 800. The gas pressure sensor 840 can be connected to the bus interface 830 to provide gas pressure data to the processor 820 and the communication interface 825. Further, a hydrophobic filter can be positioned over the gas pressure sensor 840 to protect the sensor from fluids. In some implementations, an array of gas pressure sensors can be positioned along the surface of sensation input device 800. Sensor data generated by the gas pressure sensors included in the array can be used to characterize manipulation of the sensation input device, such as insertion and extraction. The changes in gas pressure detected by the gas pressure sensors can be analyzed over time to generate a map of pressure changes and to determine corresponding sensations that can be used to replicate and/or mimic the manipulation. The sensations can be determined by the processor 820 in the sensation input device 800 or by an external computing device receiving the sensor data.

Further, the sensation input device 800 can include one or more tactile sensors 845 (or surface pressure sensors) adapted to measure the location and magnitude of pressure applied to the outer casing 805. The tactile sensors 845 also can be connected to the bus interface 830 to provide tactile pressure data to the processor 820 and communication interface 825. Additionally, one or more inertial force sensors 850, e.g. an accelerometer or a gyroscope, can be included in the sensation input device 800. An inertial force sensor 850 can output sensor data indicating either or both of an orientation of the sensation input device 800 and vector data indicating the motion of sensation input device 800. The one or more inertial force sensors 850 can be used in place of or in addition to one or more other sensors, e.g. the light sensors 835. An inertial force sensor 850 also can be connected to the bus interface 830 to provide sensor data to the processor 820 and communication interface 825.

The sensation input device 800 further can include one or more haptic force generators. For instance, a vibrating motor 855 having an eccentric mass can be included in the sensation input device 800, e.g. in the base or in the shaft. The vibrating motor 855 can be controlled by the processor 820 in response to signals received over the communication interface 825, such as from a corresponding computing device.

In some implementations, the sensation input device 800 can be associated with a cradle (or dock). The cradle can include a transceiver for transmitting commands to and receiving data from the communication interface 825 of the sensation input device 800. Further, the cradle can include a charging interface for charging a power supply 860 included in the sensation input device 800. In some implementations, the charging interface can include one or more contacts configured to mate with corresponding contacts on the sensation input device 800. In some other implementations, the charging interface can generate a charging field, through which the cradle and the sensation input device 800 can be inductively coupled. While housed in the cradle, the sensation input device 800 can charge the power supply 860. Further, once removed from the cradle, the sensation input device 800 can communicate with either or both of the cradle and an associated computing device.

The cradle also can include a wired or wireless communication interface for communicating bi-directionally with an associated computing device. For example, the cradle can transmit data signals received from the sensation input device 800 to the computing device and can receive from the computing command signals to be transmitted to the sensation input device 800. Further, the sensation input device 800 and either or both of the cradle and an associated computing device can be paired, such that wireless communications to and from the sensation input device 800 can be identified. Additionally, the sensation input device 800 can include a unique identifier for use in authentication with an associated computing device. For instance, a computing device can be configured to communicate with a sensation input device 800 only after an authentication process has been successfully completed. Also, in some implementations, the processor 820 can be configured to encrypt data transmitted by the sensation input device 800 and to decrypt data received by the sensation input device 800.

Figure 9:
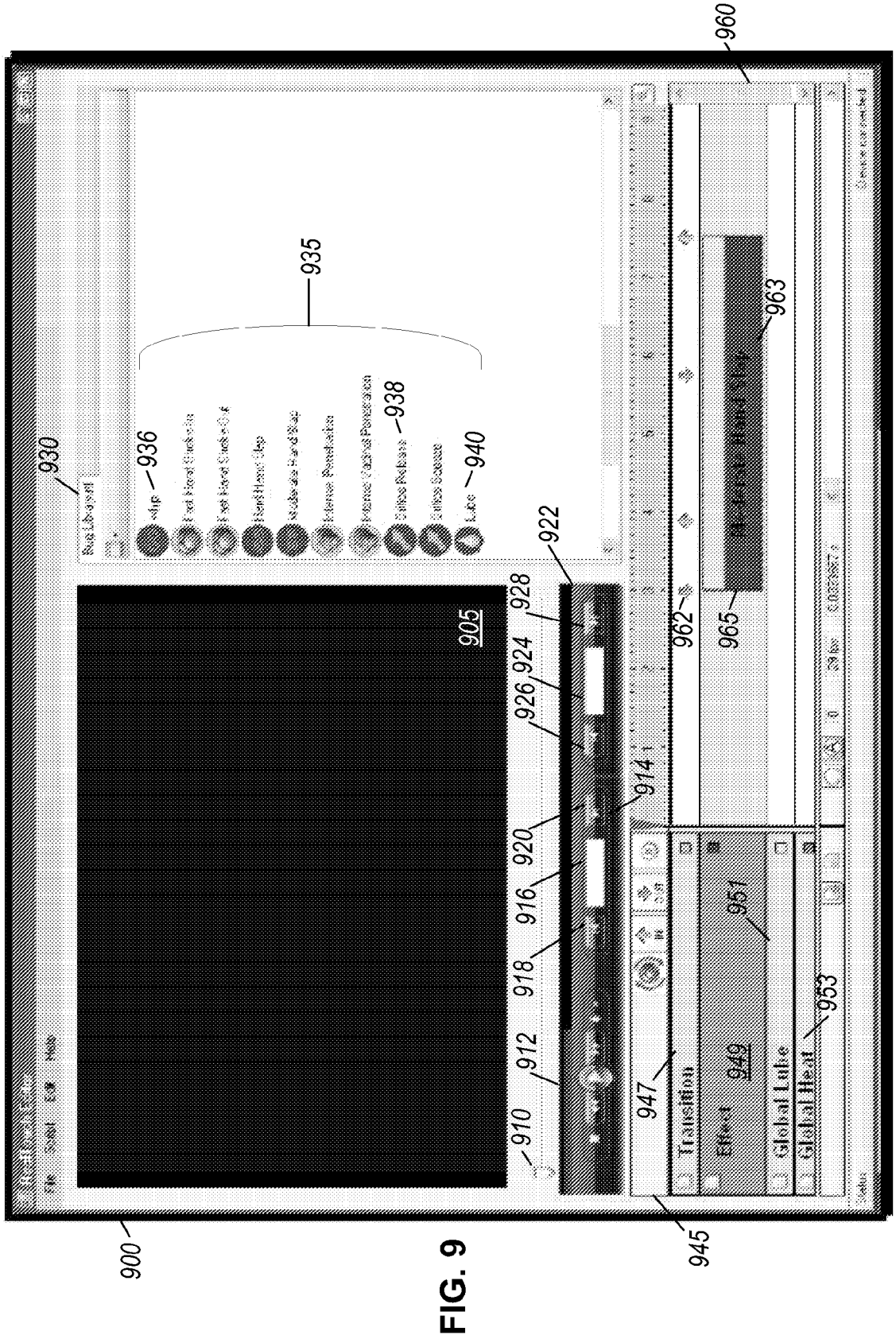
FIG. 9 shows an exemplary interface for encoding media content with haptic data.

FIG. 9 shows an exemplary interface for encoding media content with haptic data. A haptic encoding interface 900 can include a media window 905 in which one or more items of media content can be presented and encoded with haptic data. For instance, recorded video content, recorded audio content, or a combination thereof can be presented in the media window 905. A play head 910 can indicate the playback position in the content being presented. Further, one or more playback controls can be used to control the presentation of the media content in media window 905. A playback controller 912 can include one or more of a stop control, a play control, a rewind control, an advance control, and an audio level control, which can be actuated in the haptic encoding interface 900 through use commands, e.g. keystrokes and mouse clicks. A frame controller 914 also can be associated with the media window 905, such that the frame of media content presented in the media window 905 can be specified and controlled. The frame controller 914 can include a frame display 916, which can display the number of the frame being presented, a frame decrement button 918, and a frame advance button 920. Additionally, a time controller 922 can be associated with the media window 905 to specify and control the time in the media content that is being presented. The time controller 922 can include a time display 924, e.g. in seconds, a time decrement button 926, and a time advance button 928.

In some implementations, the media window 905 also can be configured to display real-time or near real-time media corresponding to a live capture event, such as a video chat session. Thus, one or more items of haptic data can be associated with the live capture event. In such implementations, the play head 910 can indicate the current point in the presentation timeline. Also, one or more of the playback controls can be deactivated or removed from the display.

An object library 930 also can be presented in the haptic encoding interface 900. The object library can include one or more haptic command (or haptic effect) icons 935. The haptic command icons 935 can correspond to one or more functions that can be performed by a sensation output device, including the generation of stimulus and the activation of an environmental factor, such as heat or lubrication. A periodic force icon, e.g. whip icon 936, can be used to represent a specific periodic force. A vector force icon, e.g. orifice release icon 938, can be used to represent a specific vector force. Icons representing specific compound forces and repeating compound forces also can be presented in the object library 930. The compound and repeating compound forces can be any combination of periodic and/or vector forces. Further, a device operation icon, e.g. lube icon 940, can be used to represent an environmental factor, e.g. lubrication or heat. One or more of the haptic command icons 935 included in the object library 930 can be selected through user input and associated with a portion of the media content in media window 905. In some implementations, multiple object libraries can be included in the haptic encoding interface 900 and an individual object library can be presented, e.g. by selecting a corresponding tab.

One or more timeline layers 945 also can be included in the haptic encoding interface 900. Each layer can correspond to a category of effect or effect transition that can be associated with the media content being presented and encoded. A layer can be added or deleted as desired to include an additional category. Also, a color can be associated with each layer, such that effects corresponding to that layer can be presented in that color and graphically distinguished in the haptic timeline 960. The scale of the haptic timeline 960 can be set to one of a variety of values, including media time and frames.

One or more of the timeline layers 945 can be repositioned, such as to place the layer on which a user is working at the top level. A transition layer 947 can show transitions associated with corresponding effects in the effect layer 949, such as repeating compound effects. The location of a transition event can be graphically depicted in the haptic timeline 960 using a transition indicator 962. Further, an effect corresponding to a transition can be presented in the effect layer 949. For example, a moderate handslap icon 963 can be presented in the haptic timeline 960 to indicate the position relative to the media timeline at which the haptic effect will be presented. The moderate handslap icon 963 can have a length corresponding to its duration in the haptic timeline 960 and a colored region 965 indicating the amplitude of the effect. Additional layers can be associated with other functions. For example, a global lube layer 951 can be used to identify the time in the haptic timeline 960 at which lubricant is to be dispensed, as well as the duration and/or amount to be dispensed. Also, a global heat layer 953 can be used to identify the time in the haptic timeline 960 at which a heater in the sensation output device is to be activated, the duration for which the heater is to be activated, and the level of heat to be provided.

FIG. 10 shows an exemplary vector force command. The vector force command 1000 can be encoded in an item of media, such as in a track of a DVD or video file. Further, vector force command 1000 can be transmitted from a playback device, such as a computing system hosting a media player, to a sensation output device. The sensation output device can receive the vector force command 1000 in control circuitry, e.g. a processor, and transmit corresponding control signals to one or more components, e.g. actuators, to execute the vector force command 1000. In some implementations, vector force commands, periodic commands, heat commands, and lube commands also can be represented using a shortened notation that corresponds to a predetermined set of values that represent the command.

The vector force command 1000 can be represented using multiple Bytes, such as Bytes 0 . . . 3 1005. Each Byte included in the vector force command 1000 also can include eight bits numbered 0 . . . 7 1010, with 0 being the least significant bit and 7 being the most significant bit. Further, each Byte included in the vector force command 1000 can represent a component of the vector force, multiple components of the vector force, or a portion of a component of the vector force. For example, Bytes 0 and 1 of the vector force command 1000 can identify the duration of the vector force. The duration can represent a measure of time, e.g. milliseconds or seconds. Byte 2 of the vector force command 1000 can represent a magnitude of the vector force, having a value of 0 . . . 255. In other instances, the number of bits used to represent a value, such as magnitude, can be larger or smaller. Further, bits 0 . . . 2 of Byte 3 can identify an axis or actuator corresponding to the vector force, such as an orifice or one or more actuators associated with one or more interface surfaces, e.g. belts. Bit 3 of Byte 3 can identify a direction, such as a positive direction or a negative direction. Additionally, bits 4 . . . 7 of Byte 3 can identify a command, such as a periodic command.

In some implementations, a vector force command can include fewer, more, or different components. For example, a vector force command also can include one or more of an attack starting value, an attack duration, a decay ending value, and a decay duration. The attack and decay can define an envelope for the corresponding force. For instance, the attack can identify how the magnitude of the force effect initiates and the decay can identify how the magnitude of the force terminates. Additionally, in some implementations, a vector force command can be combined with another command, e.g. a period command, to generate a compound command.

FIG. 11 shows an exemplary periodic force command. The periodic force command 1100 also can be encoded in an item of media, such as in a track of a DVD or video file. Further, the periodic force command 1100 can be transmitted from a playback device, such as a computing system hosting a media player, to a sensation output device. The sensation output device can receive the periodic force command 1100 in control circuitry, e.g. a processor, and transmit corresponding control signals to one or more components, e.g. actuators, to execute the periodic force command 1100.

The periodic force command 1100 can be represented using multiple Bytes, such as Bytes 0 . . . 4 1105. Each Byte included in the periodic force command 1100 also can include eight bits numbered 0 . . . 7 1110, with 0 being the least significant bit and 7 being the most significant bit. Further, each Byte included in the periodic force command 1100 can represent a component of the periodic force, multiple components of the periodic force, or a portion of a component of the periodic force. For example, Bytes 0 and 1 of the periodic force command 1100 can identify the duration of the force. The duration can represent a measure of time, e.g. milliseconds or seconds. For instance, Bytes 0 and 1 can define a 16-bit duration value corresponding to milliseconds. Also, one or more values can be restricted, such as a duration of 0. Byte 2 of the periodic force command 1100 can represent a magnitude of the force, having a value of 0 . . . 255. In other instances, the number of bits used to represent a value, such as magnitude, can be larger or smaller. Further, bits 0 . . . 2 of Byte 3 can identify an axis or actuator corresponding to the periodic force, such as an orifice or one or more actuators associated with one or more interface surfaces, e.g. belts. Bit 3 of Byte 3 can identify a direction, such as a positive direction or a negative direction. Also, bits 4 . . . 7 can identify a periodic command, such as a hand slap. Additionally, Byte 4 can define the period, e.g. in milliseconds, of the periodic waveform associated with the force. One or more values of the period, e.g. 0, also can be restricted.

In some implementations, a periodic force command can include fewer, more, or different components. For example, a periodic force command also can include one or more of an attack starting value, an attack duration, a decay ending value, and a decay duration. The attack and decay can define an envelope for the corresponding force.

Figure 12:
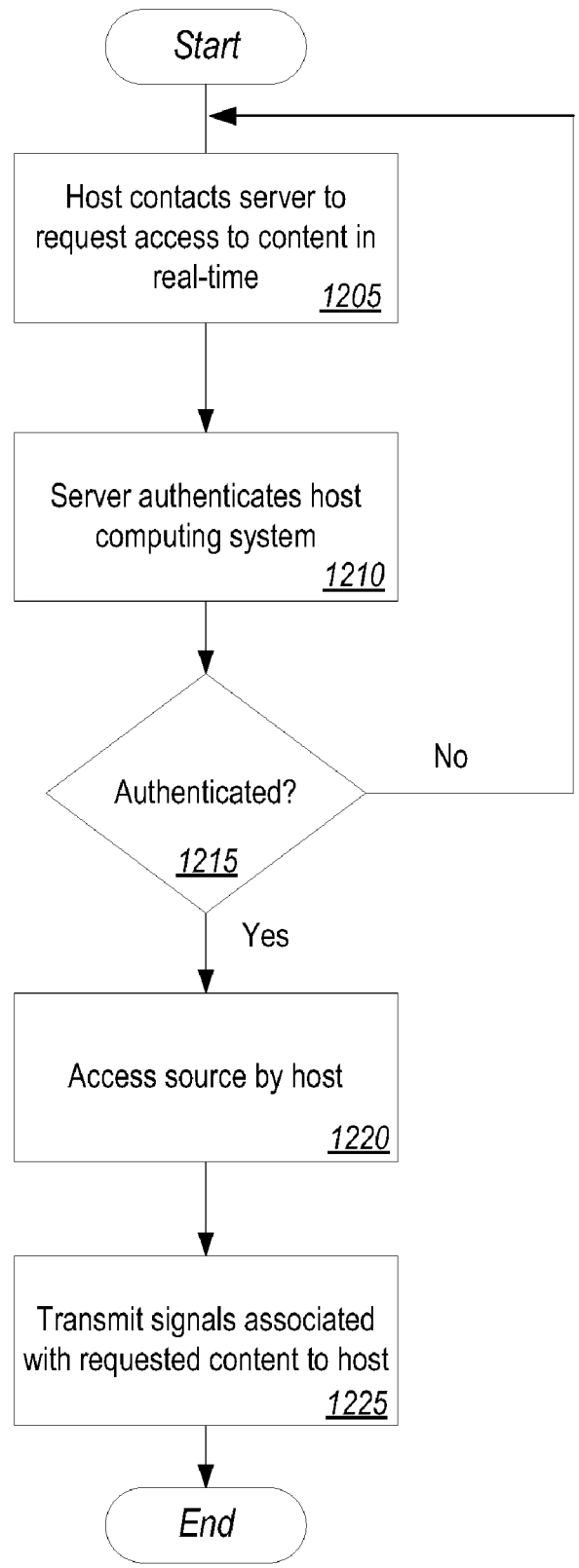
FIG. 12 presents an exemplary process for transmitting haptic data to a sensation output device.

FIG. 12 presents an exemplary process for transmitting haptic data to a sensation output device in a real-time mode. A host computing system that includes an associated sensation output device can contact a server to request access to content in a real-time mode (1205). For example, the server can identify one or more items and/or sources of content that can be accessed by a host computing system in real-time. The content available in the real-time mode can be provided by the server, one or more source computing systems, or a combination thereof. In the real-time mode, content can be transmitted in real-time or near real-time to the host computing system. The content can be media, e.g. audio, video, or audio/video, that has associated haptic data, including haptic force commands that can be executed by a sensation output device. Further, the content available in real-time mode can be interactive. For instance, the content can be generated in a chat model, including bi-directional communication between the host computing system and a source computing system.

The server receiving the request can authenticate the host computing system (1210). Authentication can be performed to ensure that the host computing system is permitted to access one or more items of content available through the server in a real-time mode. In some implementations, the server can authenticate the host computing system through one or more user supplied credentials, such as a user name and password. In some other implementations, the sensation output device can be configured to provide authentication information. For example, the sensation output device can generate an identifier in response to a query from the server, which can be transmitted through the host computing system. The identifier can be used to verify that the host computing system to which the sensation output device is attached should be permitted to access the requested content. Further, circuitry included in the sensation output device can be programmed with a unique code that can be used for authentication and identification.

In some implementations, in addition to performing authentication, the server also can be configured to receive payment information from the host computing system. For example, the server can provide information to the host computing system indicating a cost for the requested access and, in response, can receive payment information, such as a credit card authorization. The server can evaluate the authentication information provided by the host computing system to determine whether the requested access can be granted (1215). Further, if payment is required, the server also can verify that the proper payment has been rendered. If the host computing system cannot be authenticated, the server can generate an error message and permit the host computing system to once again request access to content (1205).

If the host computing system has been authenticated, the server can provide information enabling the host computing system to access the source of the requested content (1220). In some implementations, the host computing system can be connected directly with a source computing system, such that the host computing system and the source computing system can communicate peer-to-peer. For example, the server can redirect the host computing system to a source computing system associated with the requested content. In some other implementations, the host computing system can remain connected to the server, which can provide access to the content. For example, a source computing system can generate content that can be provided to the server for broadcast to one or more subscribing hosts.

Once the host computing system accesses the source, signals associated with the requested content can be transmitted to the host computing system (1225). The content can include haptic data and one or more of video data and audio data. Further, in some implementations, one or more messages can be exchanged between the host computing system and the source computing system, such as audio or text messages. The message transmission can be unidirectional or bidirectional. In some implementations, haptic data associated with the source content can be generated based on data captured by a sensation input device. For example, video and/or audio data can be captured while an operator manipulates a sensation input device. In some other implementations, haptic data can be associated with live-captured video and/or audio through a haptic encoding interface, such as discussed with respect to FIG. 9.

The signals received by the host computing system can be output to a user through a display, one or more speakers, and the sensation output device. For instance, a playback application associated with the host computing system can be configured to transmit the received haptic data to the sensation output device for processing and presentation. The haptic data also can be synchronized with the media data, such that presentation of the haptic data and corresponding media data can be coordinated. Further, the host computing system can continue to receive the signals until the requested content ends or the connection is terminated. In some implementations, signals from a source computing system that are routed through the server for transmission also can be stored at the server for subsequent, time-delayed playback. For example, the haptic data and the video and/or audio data can be stored accessible to the server, such that the data can be transmitted to a subsequent requesting user.

In some implementations, a host computing system can contact a source computing system directly, such as at a known address or through a messaging application. A connection then can be established over which data, including haptic data, can be transmitted between the source computing system and the host computing system. Thus, a private connection can be formed between two or more systems without the participation of an intervening server, such as a content directory. In some implementations, the connection between the source and host computing systems can be configured to permit the bi-directional transfer of audio data, video data, and/or haptic data. Further, the connection between the host computing system and the source computing system can be maintained until it is terminated by either system.

Figure 13:
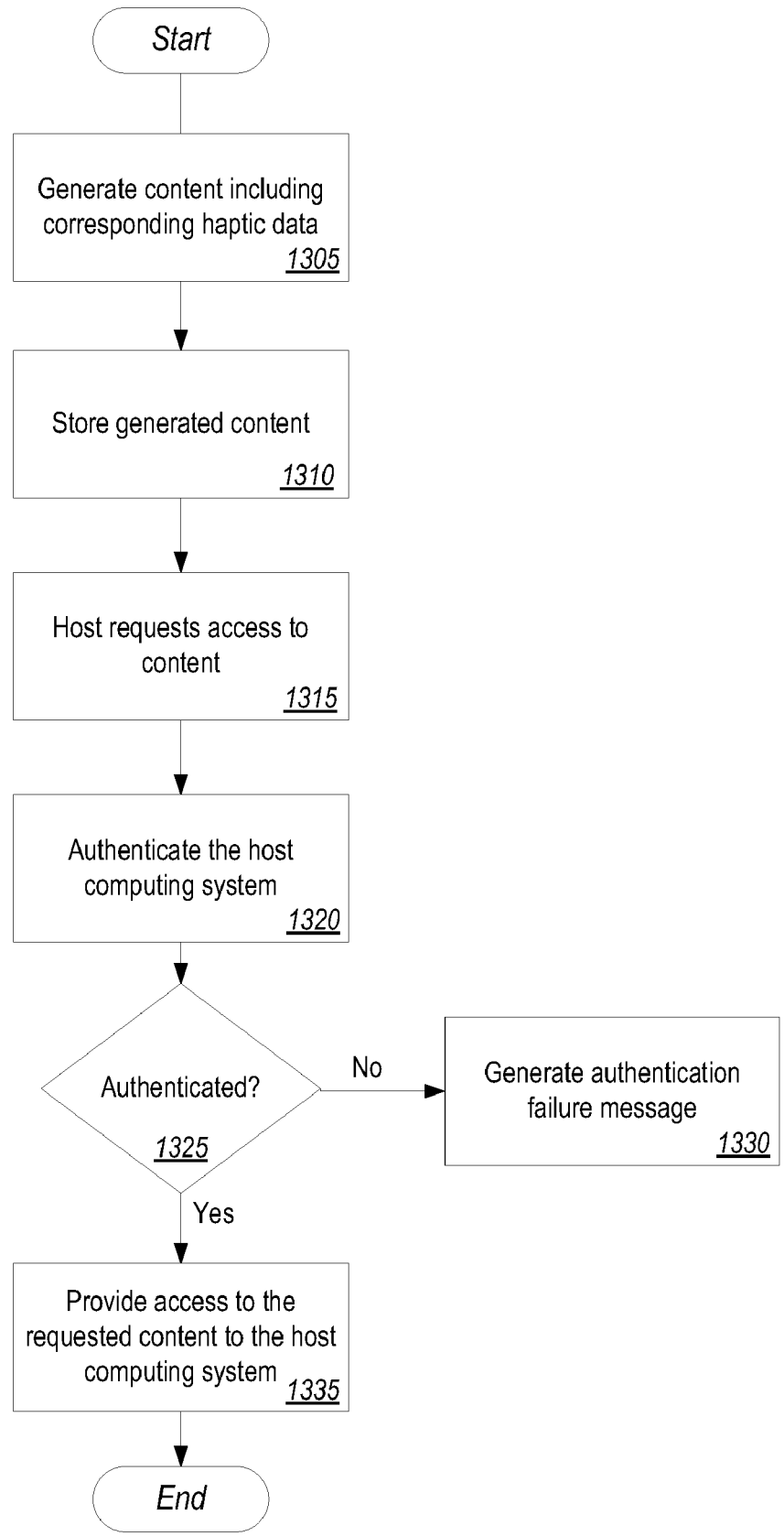
FIG. 13 presents an exemplary process for transmitting pre-recorded content including haptic data to a sensation output device.

FIG. 13 presents an exemplary process for transmitting pre-recorded content including haptic data to a sensation output device. Content that includes haptic data can be generated and stored for subsequent distribution to one or more users (1305). In addition to haptic data, the content can include one or more of audio data, video data, and control information. Control information can be configured to cause a playback device, such as a host computing system, to perform one or more functions, including authentication and activation/deactivation of the content. In some implementations, content can be recorded in a live capture session, in which haptic data is generated contemporaneously with at least some other data included in the content, such as audio and video data. For example, a video recording can be made of a person, such as a performer, manipulating a sensation input device. Sensor signals output by the sensation input device can be used to generate haptic data, which can be associated with the corresponding portion of the video recording. In some other implementations, haptic data can be added to an existing recording, such as a video segment. Further, the haptic data can be computer generated, such as by associating one or more modeled sensations with one or more frames of the video segment. Media content can be encoded with haptic data through a haptic encoding interface, such as discussed with respect to FIG. 9.

In some implementations, a modeled sensation can be generated using one or more replacement stimuli to mimic or replicate a real-world sensation. For example, the sensation output device can activate one or more components, including belts, motors, clamps, vibrators, and heaters, in response to haptic data signals to produce a sensation. Some physical acts, such as pressure or touch, can be reproduced directly. Other physical acts, such as suction, can be reproduced indirectly through the use of one or more other sensations, including high frequency vibration and pressure. For example, impact forces can be simulated by the rapid opening and closing of an orifice contacting a portion of the body, e.g. at the base of the penis.

The generated content, including the haptic data, can be stored electronically (1310). For example, the generated content can be stored in one or more files, such as on a server or networked storage device. In some implementations, the generated content can be stored in a streaming format Alternatively, the generated content can be stored on portable digital media, such as a compact disc (CD), digital versatile disc (DVD), or flash drive, which can be accessed locally by a playback device.

A host computing system can request access to the stored content, such as by requesting to download or stream the content (1315). Before granting access to the requested content, the host computing system can be authenticated (1320). In some implementations, a server can authenticate the host computing system through one or more user supplied credentials, such as a user name and password. In some other implementations, the sensation output device can be configured to provide authentication information. Authentication also can be performed in response to a request to access the stored content locally, such as from a CD or DVD. For instance, the playback application can be required to authenticate the sensation output device before enabling playback of the stored content or before authorizing access to the corresponding haptic data.

The authentication information provided by the host computing system or the sensation output device can be analyzed to determine whether the requested access can be granted (1325). Further, if payment is required to access the requested content, a server also can verify that the proper payment has been rendered. If the host computing system cannot be authenticated, an authentication failure message can be generated (1330).

Alternatively, if the authentication is successful, access to the requested content can be granted to the host computing system (335). For example, a server can permit the host computing system to download one or more files containing the requested content or can initiate streaming of the requested content. If the requested content is stored locally, the requested content can be unlocked or otherwise rendered accessible.

Figure 14:
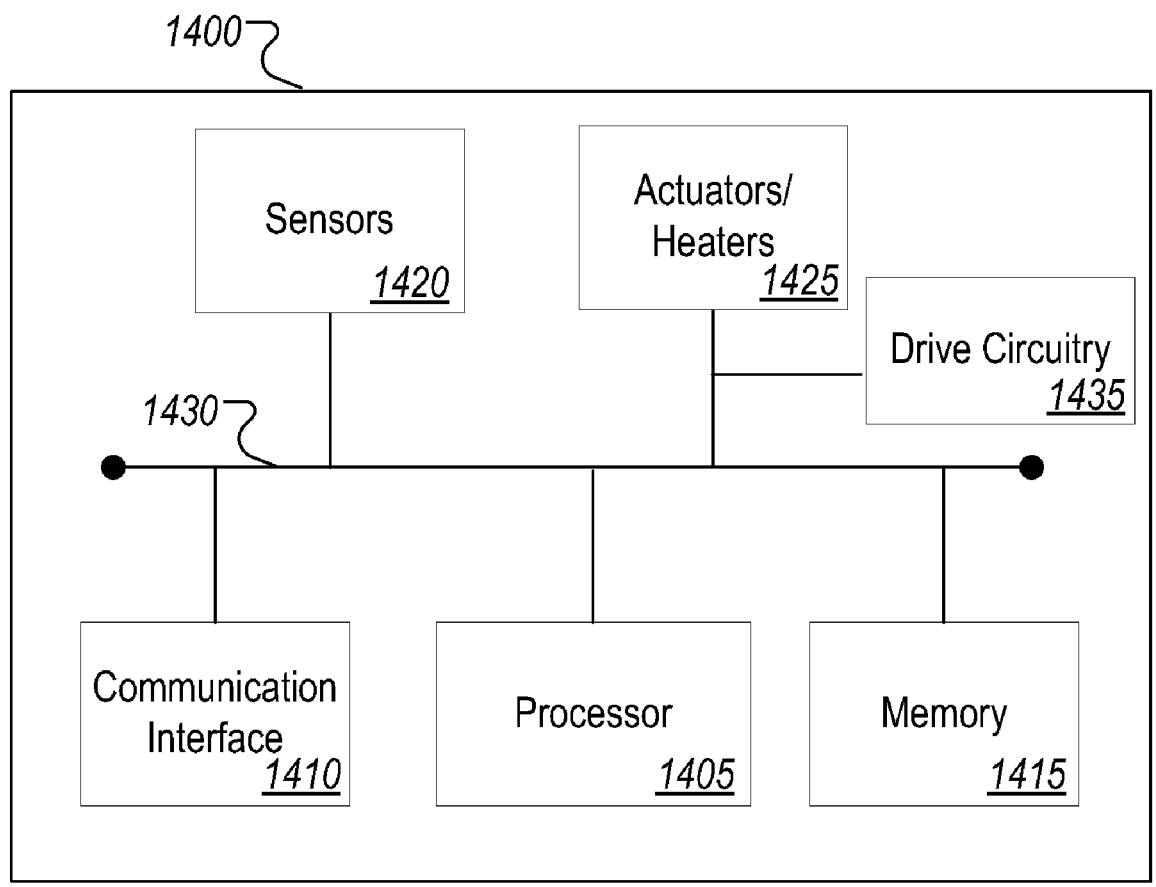
FIG. 14 presents an exemplary arrangement of control circuitry included in a sensation output device.

FIG. 14 presents an exemplary arrangement of control circuitry included in a sensation output device. The sensation output device 1400 can include a processor 1405 (or microprocessor) configured to execute one or more instructions, including instructions stored in a memory 1415 and instructions, e.g. haptic commands, received from an external computing system. For instance, the processor 1405 can receive haptic data including haptic commands from the communication interface 1410. The processor 1405 can then generate one or more signals to components, e.g. actuators, included in the sensation output device 1400 based on the received haptic data. The processor 1405 can be a general or special purpose processor, and can be implemented as a single processor or as a combination of processors. Further, the processor 1405 can be configured to communicate with all of the components included in the sensation output device 1400 over a bus 1430.

The communication interface 1410 can be configured to communicate bi-directionally with one or more external devices, such as a cradle and a host computing device. For instance, the communication interface 1410 can receive haptic data, including one or more haptic commands, from an external computing system. Further, the communication interface can be configured to transmit sensor data generated in the sensation output device 1400 to an external computing system. The communication interface 1410 can include either or both of a wired communication interface, e.g. a USB or FireWire interface, or a wireless interface, e.g. an IR or RF interface.

The memory 1415 included in the sensation output device 1400 can be either or both of volatile memory, e.g. RAM, and nonvolatile memory, e.g. ROM. The memory 1415 can be configured to store operating instructions, including one or more force commands, for execution by the processor 1405. For instance, the memory 1415 can stored a library of haptic force commands which can be identified by a reference code or other such shortened representation. During operation, an external computing system can communicate the reference code for a command to the sensation output device 1400 and the processor 1405 can translate the reference code into one or more components corresponding to a force command. Further, the memory 1415 can store one or more operating routines, which can be executed to output a series of haptic forces without the cooperation of an external computing device. Additionally, the memory 1415 can be configured to store one or more items of data temporarily or permanently. For example, sensor data received from one or more sensors 1420 can be temporarily stored for transmission to an external computing system. Also, the sensation output device 1400 can be updated, such as by permanently storing new haptic commands and/or revised operating instructions.

The sensation output device 1400 can include multiple sensors 1420, including temperature sensors, position sensors, light sensors, pressure sensors, inertial sensors, power sensors, and biometric sensors for collecting data from a user, e.g. heart rate and/or blood pressure. The sensors 1420 can be configured to provide sensor data to the processor 1405 whenever the sensation output device 1400 is powered on. Alternatively, one or more of the sensors 1420 can be placed into an idle state when the sensation output device 1400 is inactive, such as during charging.

Additionally, the sensation output device 1400 can include one or more actuators/heaters 1425, which can be controlled by the processor 1405, e.g. directly or through specialized drive circuitry 1435. One or more of the actuators/heaters 1425 can be configured to receive binary operating signals, e.g. on/off. Other actuators/heaters 1425 included in the sensation output device 1400, e.g. bi-directional motors, can be controlled by the specialized drive circuitry 1435 in response to complex control signals, such as instructions specifying direction and amplitude.

Processor 1405 also can be configured to execute one or more algorithms stored in the memory 1415. For instance, the processor 1405 can be configured to execute an idle algorithm to warm at least a portion of the sensation output device 1400, e.g. one or more interface surfaces, when the device is powered on but no haptic forces are being generated. The idle algorithm can be configured to activate one or more heating elements, at least periodically, to maintain the internal temperature of the sensation output device within a predetermined operating range. The idle algorithm also can cause the processor to activate one or more actuators, at least periodically, to move one or more corresponding interface surfaces and thus distribute heat within the sensation output device 1400. Further, the idle algorithm can be terminated upon the occurrence of one or more predetermined events, such as receipt of a command or expiration of an idle timer.

Additionally, the processor 1405 can be configured to execute one or more authentication and/or security protocols. For instance, the processor 1405 can communicate identification information corresponding to the sensation output device 1400 to an authentication server, either directly or through a host computing device. If the sensation output device 1400 can be authenticated, the processor 1405 can receive a response from the authentication server, e.g. including the identification information corresponding to the sensation output device 1400. Further, the processor 1405 can be configured to enable the sensation output device 1400 for further operation if the response can be validated. Otherwise, the processor 1405 can disable the sensation output device 1400.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions tangibly encoded on a computer-readable medium for execution by, or to control the operation of, data processing apparatus. The computer-readable medium can be a machine-readable storage device, a machine-readable storage substrate, a memory device, or a combination thereof. The term "data processing apparatus" encompasses all apparatus, devices, and machines for processing data, including by way of example a programmable processor, a computer, or multiple processors or computers. The apparatus can include, in addition to hardware, code that creates an execution environment for the computer program, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program need not correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array), a PLD (programmable logic device), or an ASIC (application-specific integrated circuit).

Processors suitable for the execution of a computer program include both general and special purpose microprocessors, and one or more processors of any kind of digital computer. Generally, a processor can receive instructions and data from either or both of a read-only memory and a random access memory. The essential elements of a computer are a processor for performing instructions and one or more memory devices for storing instructions and data. Generally, a computer also can include, or be operatively coupled to receive data from and/or transfer data to one or more mass storage devices, e.g., magnetic, magneto-optical, or optical disks.

Moreover, a computer can be embedded in another device, such as a mobile telephone, a personal digital assistant (PDA), or a mobile audio player. Computer-readable media suitable for storing computer program instructions and data include all forms of non-volatile memory, media and memory devices, including semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on or in conjunction with a computer having a display device, e.g., an LCD (liquid crystal display) or OLED (organic light emitting diode) display, for presenting information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations, but rather as descriptions of features specific to particular embodiments. Certain features that are described in this specification in the context of separate embodiments also can be implemented in combination in a single embodiment. Conversely, various features that are described in the context of a single embodiment also can be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed. In certain circumstances, multi-tasking and parallel processing may be advantageous. Moreover, the separation of various system components in the embodiments described above should not be understood as requiring such separation in all embodiments, and it should be understood that the described program components and systems generally can be integrated together in a single software product or packaged into multiple software products.

Thus, particular embodiments have been described. Other embodiments are within the scope of the following claims. For example, the actions recited in the claims can be performed in a different order and still achieve desirable results.

The invention claimed is:

1. A sensation output apparatus comprising:
   a processor adapted to generate one or more control signals corresponding to a haptic command;
   an actuator adapted to output a force to a drive mechanism in response to one or more control signals received from the processor;
   an opening through which a portion of a user's body can be inserted; and
   an interface surface coupled to the drive mechanism, the interface surface configured to at least partially contact the inserted portion of the user's body;
   wherein the interface surface comprises a compliant belt coupled with a carrier belt, the carrier belt interfacing with at least a portion of the drive mechanism.

2. The apparatus of claim 1, wherein the carrier belt includes timing windows configured to receive teeth associated with the drive mechanism.

3. The apparatus of claim 1, wherein the compliant belt includes one or more surface features.

4. The apparatus of claim 1, further comprising:
a heater, responsive to one or more control signals, configured to heat the interface surface.

5. The apparatus of claim 1, further comprising:
a lubrication system, comprising a lubrication reservoir including a lubricant, a lubrication pump, and an outlet port adjacent to the interface surface, the lubrication system being configured to output lubricant to the interface surface responsive to one or more control signals.

6. The apparatus of claim 1, wherein the actuator comprises a motor capable of bidirectional movement.

7. The apparatus of claim 1, further comprising:
a second interface surface configured to at least partially contact the inserted portion of the user's body.

8. The apparatus of claim 1, further comprising:
a communication interface coupled to the processor and configured to receive haptic commands from an associated computing device.

9. The apparatus of claim 1, further comprising:
a memory coupled to the processor, the memory storing an algorithm comprising one or more haptic commands.

10. A system comprising:
a host computing system storing a media file having associated haptic data; and
a sensation output device coupled to the host computing system, the sensation output device comprising:
a processor configured to receive haptic data from the host computing system and to generate one or more control signals corresponding to the received haptic data;
an actuator adapted to output a force to an interface surface in response to one or more control signals received from the processor; and
an opening through which a portion of a user's body can be inserted;
wherein the interface further comprises a compliant belt including one or more surface features.

11. The system of claim 10, wherein the sensation output device further comprises:
a wireless communication interface coupled to the processor, the wireless communication interface configured to communicate with the host computing system.

12. The system of claim 10, wherein the opening further comprises:
an orifice having an actuator configured to drive a carrier gear in response to one or more control signals received from the processor; and
a plurality of flexible extensions movably coupled to the carrier gear.

13. The system of claim 10, wherein the sensation output device further comprises:
a sensor, coupled to the processor, wherein the sensor is capable of detecting a biometric reading associated with a sensation output device user.

14. A method of generating haptic forces, the method comprising:
accessing a haptic command associated with an item of media content;
generating one or more control signals corresponding to the accessed haptic command; and
moving, by an actuator in a sensation output device, an interface surface in response to the one or more control signals;
wherein the interface surface comprises a compliant belt configured to contact at least a portion of a user's body inserted into the sensation output device.

15. The method of claim 14, further comprising:
generating the one or more control signals in conjunction with presenting the item of media content.

16. The method of claim 14, further comprising:
activating a lubrication system included in the sensation output device in response to the one or more control signals; and
dispensing lubricant from the lubrication system onto the interface surface.

17. The method of claim 14, further comprising:
moving, by another actuator in the sensation output device, another interface surface in response to the one or more generated control signals.

18. The method of claim 14, further comprising:
adjusting an orifice included in the sensation output device in response to the one or more generated control signals.

19. The method of claim 14, wherein the compliant belt includes one or more surface features consisting of one or more of a textured pattern, ridges, bumps, grooves, dimples and raised areas.

20. The method of claim 14, wherein the compliant belt is coupled with a carrier belt, the carrier belt interfacing with at least a portion of a drive mechanism, the method further comprising outputting, with the actuator, a force to the drive mechanism to move the carrier belt in response to the one or more control signals.

* * * * *